United States Patent
Hosseini et al.

(10) Patent No.: US 11,502,787 B2
(45) Date of Patent: *Nov. 15, 2022

(54) REPETITION-BASED TRANSMISSION

(71) Applicant: QUALCOMM incorporated, San Diego, CA (US)

(72) Inventors: Seyedkianoush Hosseini, San Diego, CA (US); Wanshi Chen, San Diego, CA (US); Umesh Phuyal, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,747

(22) Filed: May 18, 2021

(65) Prior Publication Data

US 2021/0273748 A1 Sep. 2, 2021

Related U.S. Application Data

(63) Continuation of application No. 16/407,579, filed on May 9, 2019, now Pat. No. 11,025,373.

(Continued)

(51) Int. Cl.
*H04L 1/18* (2006.01)
*H04W 28/02* (2009.01)
*H04W 72/04* (2009.01)

(52) U.S. Cl.
CPC ............ *H04L 1/189* (2013.01); *H04L 1/1887* (2013.01); *H04L 1/1893* (2013.01);
(Continued)

(58) Field of Classification Search
CPC ..... H04L 1/189; H04L 1/1887; H04L 1/1893; H04L 1/0025; H04L 1/08; H04W 28/0215;
(Continued)

(56) References Cited

U.S. PATENT DOCUMENTS 11,025,373 B2    6/2021  Hosseini et al.
2017/0019216 A1*  1/2017  Li ....................... H04W 72/042
(Continued)

FOREIGN PATENT DOCUMENTS

TW          201807971 A       3/2018

OTHER PUBLICATIONS

International Preliminary Report on Patentability—PCT/US2019/031853, The International Bureau of WIPO—Geneva, Switzerland, dated Nov. 26, 2020.
(Continued)

*Primary Examiner* — Thien Nguyen
(74) *Attorney, Agent, or Firm* — Holland and Hart

(57) ABSTRACT

Methods, systems, and devices for wireless communications are described. In some wireless communications systems, devices may implement transmission repetitions for transport blocks (TBs) to improve reception reliability. However, to support low latency, TBs may be transmitted in any transmission time interval (TTI) within a subframe. The systems may implement process to handle these TB repetitions. In some cases, a device may receive, during a TTI of a subframe, control information including an indication of transmission repetitions of a TB for a plurality of TTIs, identify a quantity of transmission repetitions of the TB based on the control information, and monitor for the transmission repetitions of the TB.

30 Claims, 12 Drawing Sheets

Related U.S. Application Data

(60) Provisional application No. 62/670,668, filed on May 11, 2018.

(52) U.S. Cl.
CPC ..... *H04W 28/0215* (2013.01); *H04W 72/042* (2013.01); *H04W 72/0446* (2013.01)

(58) Field of Classification Search
CPC ............ H04W 72/042; H04W 72/0446; H04B 7/0617
See application file for complete search history.

(56) References Cited

U.S. PATENT DOCUMENTS

| | | | |
|---|---|---|---|
| 2017/0094649 A1* | 3/2017 | Shi | H04L 1/08 |
| 2019/0334688 A1 | 10/2019 | Kwak et al. | |
| 2019/0342058 A1* | 11/2019 | Kwak | H04L 1/1896 |
| 2019/0349137 A1 | 11/2019 | Hosseini et al. | |
| 2019/0349138 A1 | 11/2019 | Hosseini et al. | |

OTHER PUBLICATIONS

International Search Report and Written Opinion—PCT/US2019/031853—ISA/EPO—dated Oct. 9, 2019.
Partial International Search Report—PCT/US2019/031853—ISA/EPO—dated Aug. 9, 2019.
Qualcomm Incorporated: "Downlink Enhancements for URLLC", 3GPP Draft; R1-1804933 Downlink Enhancements for URLLC, 3rd Generation Partnership Project (3GPP), Mobile Competence Centre, 650, Route Des Lucioles ; F-06921 Sophia-Antipolis Cedex, France, vol. RAN WG1, No. Sanya, P. R. China; Apr. 16, 2018-Apr. 20, 2018 Apr. 15, 2018, XP051427196, Retrieved from the Internet: URL:http://www.3gpp.org/ftp/Meetings%5F3GPP%5FSYNC/RAN1/Docs/ [retrieved on Apr. 15, 2018], p. 2, section 3, p. 3, section 3, p. 3, last par, p. 4, section 4, 5 pages.
Qualcomm Incorporated: "PCFICH Enhancements for URLLC", 3GPP Draft; R2-1806001 URLLC PCFICH ENH, 3rd Generation Partnership Project (3GPP), Mobile Competence Centre, 650, Route Des Lucioles ; F-06921 Sophia-Antipolis Cedex, France, vol. RAN WG2, No. Sanya. China; Apr. 16, 2018-Apr. 20, 2018 Apr. 14, 2018, XP051429607, Retrieved from the Internet: URL:http://www.3gpp.org/ftp/Meetings%5F3GPP%5FSYNC/RAN2/Docs/ [retrieved on Apr. 14, 2018], p. 1, section 2.1, p. 2, Fig. 2, 3 pages.
Taiwan Search Report—TW108116201—TIPO—dated Jun. 10, 2022.

* cited by examiner

REPETITION-BASED TRANSMISSION

CROSS REFERENCE

The present Application for Patent is a Continuation of U.S. patent application Ser. No. 16/407,579 by Hosseini et al., entitled "Repetition-Based Transmission," filed May 9, 2019, which claims priority to U.S. Provisional Patent Application No. 62/670,668 by Hosseini, et al., entitled "Repetition-Based Transmission," filed May 11, 2018, both of which are assigned to the assignee hereof and expressly incorporated by reference herein in their entirety.

BACKGROUND

The following relates generally to wireless communications, and more specifically to supporting repetition-based transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may utilize repeated transmissions of a same transport block (TB) to meet certain reliability standards. However, in low latency systems, depending on the number of transmission repetitions, a repetition window may cross a boundary between different subframes or slots. This may result in one or more of complex multiplexing and poor or unreliable reception at a device for the repeated TB transmissions.

SUMMARY

The described techniques relate to improved methods, systems, devices, and apparatuses that support repetition-based transmission. Generally, the described techniques provide for wireless devices to perform multiple transmissions, which may be referred to as repetitions, of a same TB to meet certain reliability standards or thresholds. In low latency systems, TBs may be transmitted in any transmission time interval (TTI). The systems may implement processes to handle these TB repetitions where a TB transmission may cross a slot, subframe, or eIMTA boundaries. For example, a device (e.g., a base station) may transmit control information indicating TB transmission to another device (e.g., user equipment (UE)), and the device may determine the number of transmission repetitions for the TB based on the control information. The device may implicitly or explicitly determine whether it is configured to support a TB transmission of the number of transmission repetitions that may cross slot, subframe, or eIMTA boundaries. The device may then determine how to handle the TB transmission that extends across a boundary based on whether it is configured to support boundary crossing.

A method of wireless communications at a wireless device is described. The method may include receiving, during a TTI of a subframe, control information including an indication of transmission repetitions of a transport block (TB) for a set of TTIs, identifying a quantity of transmission repetitions of the TB based on the control information, and monitoring for the transmission repetitions of the TB based on the identifying.

An apparatus for wireless communications is described. The apparatus may include a processor, memory in electronic communication with the processor, and instructions stored in the memory. The instructions may be executable by the processor to cause the apparatus to receive, during a TTI of a subframe, control information including an indication of transmission repetitions of a transport block (TB) for a set of TTIs, identify a quantity of transmission repetitions of the TB based on the control information, and monitor for the transmission repetitions of the TB based on the identifying. In some examples, the apparatus may include a receiver, where the receiver receives, during the TTI of the subframe, the control information.

Another apparatus for wireless communications is described. The apparatus may include means for receiving, during a TTI of a subframe, control information including an indication of transmission repetitions of a transport block (TB) for a set of TTIs, identifying a quantity of transmission repetitions of the TB based on the control information, and monitoring for the transmission repetitions of the TB based on the identifying.

A non-transitory computer-readable medium storing code for wireless communications at a wireless device is described. The code may include instructions executable by a processor to receive, during a TTI of a subframe, control information including an indication of transmission repetitions of a transport block (TB) for a set of TTIs, identify a quantity of transmission repetitions of the TB based on the control information, and monitor for the transmission repetitions of the TB based on the identifying.

Some examples of the method, apparatuses, and non-transitory computer-readable medium described herein may further include operations, features, means, or instructions for identifying a value in a field of a control format indicator (CFI) associated with the control information, and determining that a second TTI may be not available for transmitting one of the transmission repetitions of the TB based on the value in the field of the CFI.

In some examples of the method, apparatuses, and non-transitory computer-readable medium described herein, the value in the field of the CFI may be 2.

In some examples of the method, apparatuses, and non-transitory computer-readable medium described herein, the second TTI may be a mini-slot.

In some examples of the method, apparatuses, and non-transitory computer-readable medium described herein, monitoring for the transmission repetitions of the TB may include operations, features, means, or instructions for monitoring a physical downlink shared channel (PDSCH) for the transmission repetitions of the TB.

Some examples of the method, apparatuses, and non-transitory computer-readable medium described herein may further include operations, features, means, or instructions for determining that a second TTI may be not used for transmitting one of the transmission repetitions based on the control format indicator CFI field having a value of 2.

Some examples of the method, apparatuses, and non-transitory computer-readable medium described herein may further include operations, features, means, or instructions for determining whether an initial TTI associated with a TTI index may be available for an initial transmission associated with the transmission repetitions of the TB based on the control information.

Some examples of the method, apparatuses, and non-transitory computer-readable medium described herein may further include operations, features, means, or instructions for identifying a value in a field of a control format indicator (CFI) associated with the control information, where determining whether the initial TTI may be available for the initial transmission may be further based on the value in the field of the CFI.

Some examples of the method, apparatuses, and non-transitory computer-readable medium described herein may further include operations, features, means, or instructions for determining that the initial TTI associated with the TTI index may be unavailable for the initial transmission based on the value in the field of the CFI, and delaying the initial transmission to a second TTI after the initial TTI.

Some examples of the method, apparatuses, and non-transitory computer-readable medium described herein may further include operations, features, means, or instructions for determining that the initial TTI associated with the TTI index may be unavailable for the initial transmission based on the value in the field of the CFI, puncturing the initial TTI based on determining that the initial TTI may be unavailable, and monitoring for a subsequent TB transmission of the quantity of transmission repetitions during a second TTI after the initial TTI.

In some examples of the method, apparatuses, and non-transitory computer-readable medium described herein, the CFI may be received dynamically or semi-statically.

In some examples of the method, apparatuses, and non-transitory computer-readable medium described herein, the CFI may be received on a physical control format indicator channel (PCFICH) or via higher layer signaling.

Some examples of the method, apparatuses, and non-transitory computer-readable medium described herein may further include operations, features, means, or instructions for determining that a portion of the transmission repetitions extend across a subframe boundary based on a TTI index of an initial transmission and the control information, identifying that the wireless device may be configured to support extending across a subframe boundary, and identifying a quantity of available TTIs in a second subframe.

Some examples of the method, apparatuses, and non-transitory computer-readable medium described herein may further include operations, features, means, or instructions for determining that a PDSCH may be not mapped to resources of a TTI in the second subframe based on identifying the quantity of available TTIs, puncturing the TTI in the second subframe based on the PDSCH not being mapped to the TTI, and monitoring the portion of the transmission repetitions during the second subframe based on the puncturing.

In some examples of the method, apparatuses, and non-transitory computer-readable medium described herein, each TB transmission of the transmission repetitions may be monitored for in a different TTI of a repetition window.

Some examples of the method, apparatuses, and non-transitory computer-readable medium described herein may further include operations, features, means, or instructions for identifying a TTI index for an initial transmission associated with the transmission repetitions of the TB, determining that a portion of the transmission repetitions extend across a subframe boundary based on the TTI index of the initial transmission and the control information, and monitoring the portion of the transmission repetitions extending across a subframe boundary.

Some examples of the method, apparatuses, and non-transitory computer-readable medium described herein may further include operations, features, means, or instructions for identifying that the wireless device may be not configured to support extending across a subframe boundary, and determining a quantity of available TTIs for the transmission repetitions of the TB, where monitoring for the transmission repetitions of the TB may be further based on the quantity of available TTIs.

Some examples of the method, apparatuses, and non-transitory computer-readable medium described herein may further include operations, features, means, or instructions for determining that the quantity of available TTIs may be below the set of TTIs for the quantity of transmission repetitions of the TB, and suspending monitoring at least one TTI of the set after an ultimate TTI of the quantity of available TTIs.

Some examples of the method, apparatuses, and non-transitory computer-readable medium described herein may further include operations, features, means, or instructions for determining to monitor for the transmission repetitions of the TB until an ultimate TTI of the quantity of available TTIs based on an indication received in a downlink control information (DCI).

Some examples of the method, apparatuses, and non-transitory computer-readable medium described herein may further include operations, features, means, or instructions for identifying a configuration of the wireless device, and determining whether the wireless device may be configured to support extending across a subframe boundary based on the configuration.

In some examples of the method, apparatuses, and non-transitory computer-readable medium described herein, identifying the configuration may be based on a capability of the wireless device. In some examples of the method, apparatuses, and non-transitory computer-readable medium described herein, the capability may include a demodulation reference signal (DMRS) sharing capability, a DMRS combining capability, a configuration signaling, or an indication of the DMRS sharing capability or the DMRS combining capability relative to TTIs on each side of a subframe boundary, or a combination thereof.

Some examples of the method, apparatuses, and non-transitory computer-readable medium described herein may further include operations, features, means, or instructions for identifying a configuration of the wireless device, and determining whether the wireless device may be configured to support extending across an enhanced interference mitigation and traffic adaptation (eIMTA) boundary based on the configuration.

In some examples of the method, apparatuses, and non-transitory computer-readable medium described herein, identifying the configuration may be based on a capability of the wireless device. In some examples of the method, apparatuses, and non-transitory computer-readable medium described herein, the capability may include a demodulation reference signal (DMRS) sharing capability, a DMRS combining capability, a configuration signaling, or an indication of the DMRS sharing capability or the DMRS combining capability relative to TTIs on each side of a subframe boundary, or a combination thereof.

Some examples of the method, apparatuses, and non-transitory computer-readable medium described herein may further include operations, features, means, or instructions for determining a subframe configuration of the subframe based on the control information, and determining that a portion of the transmission repetitions extend across the eIMTA boundary based on the subframe configuration.

Some examples of the method, apparatuses, and non-transitory computer-readable medium described herein may further include operations, features, means, or instructions for identifying that the wireless device may be not configured to support extending across the eIMTA boundary based on the subframe configuration, where monitoring for the transmission repetitions of the TB further includes suspending monitoring the portion of the transmission repetitions occurring after the eIMTA boundary based on the wireless device not being configured to support extending across the eIMTA boundary.

Some examples of the method, apparatuses, and non-transitory computer-readable medium described herein may further include operations, features, means, or instructions for determining a quantity of available TTIs for the transmission repetitions of the TB based on the wireless device not being configured to support extending across the eIMTA boundary, where monitoring for the transmission repetitions of the TB may be further based on the quantity of available TTIs.

Some examples of the method, apparatuses, and non-transitory computer-readable medium described herein may further include operations, features, means, or instructions for determining that the quantity of available TTIs may be below the set of TTIs for the quantity of transmission repetitions of the TB, and suspending monitoring at least one TTI of the set after an ultimate TTI of the quantity of available TTIs.

Some examples of the method, apparatuses, and non-transitory computer-readable medium described herein may further include operations, features, means, or instructions for identifying that the wireless device may be configured to support extending across the eIMTA boundary based on the subframe configuration, where monitoring for the transmission repetitions of the TB further includes monitoring for the portion of the transmission repetitions occurring after the eIMTA boundary based on the wireless device being configured to support extending across the eIMTA boundary.

Some examples of the method, apparatuses, and non-transitory computer-readable medium described herein may further include operations, features, means, or instructions for identifying a TTI index for an initial transmission associated with the transmission repetitions of the TB, determining that the portion of the transmission repetitions extend across the eIMTA boundary based on the TTI index of the initial transmission and the control information, and monitoring the portion of the transmission repetitions extending across the eIMTA boundary based on the subframe configuration.

Some examples of the method, apparatuses, and non-transitory computer-readable medium described herein may further include operations, features, means, or instructions for identifying a quantity of available TTIs in a second subframe based on the wireless device being configured to support extending across the eIMTA boundary, determining that a PDSCH may be not mapped to resources of a TTI in the second subframe based on identifying the quantity of available TTIs, puncturing the TTI in the second subframe based on the PDSCH not being mapped to the TTI, and monitoring the portion of the transmission repetitions during the second subframe based on the puncturing.

Some examples of the method, apparatuses, and non-transitory computer-readable medium described herein may further include operations, features, means, or instructions for determining that the portion of the transmission repetitions extend across an uplink portion of a special switching subframe (SSF) associated with the subframe configuration, where monitoring for the transmission repetitions of the TB further includes suspending monitoring the portion of the transmission repetitions occurring after the uplink portion of the SSF based on the wireless device not being configured to support extending across the SSF.

Some examples of the method, apparatuses, and non-transitory computer-readable medium described herein may further include operations, features, means, or instructions for determining that the portion of the transmission repetitions extend across an uplink subframe associated with the subframe configuration, where the transmission repetitions may be in a downlink transmission and monitoring for the transmission repetitions of the TB further includes suspending monitoring the portion of the transmission repetitions occurring after the uplink subframe based on the wireless device not being configured to support extending across the uplink subframe.

Some examples of the method, apparatuses, and non-transitory computer-readable medium described herein may further include operations, features, means, or instructions for determining that the portion of the transmission repetitions extend across an uplink portion of a special switching subframe (SSF) associated with the subframe configuration, where monitoring for the transmission repetitions of the TB further includes delaying or puncturing a subframe following the SSF for monitoring the portion of the transmission repetitions occurring after the uplink portion of the SSF based on the wireless device being configured to support extending across the SSF.

Some examples of the method, apparatuses, and non-transitory computer-readable medium described herein may further include operations, features, means, or instructions for determining that the portion of the transmission repetitions extend across an uplink subframe associated with the subframe configuration, where the transmission repetitions may be in a downlink transmission and monitoring for the transmission repetitions of the TB further includes delaying or puncturing a subframe following the uplink subframe for monitoring the portion of the transmission repetitions occurring after the uplink subframe based on the wireless device being configured to support extending across the uplink subframe.

DETAILED DESCRIPTION

A user equipment (UE) and/or a base station may transmit or receive multiple transmissions, also referred to as repetitions, of a transport block (TB), to ensure compliance with a reliability standard. When low latency is a priority, these repetitions may be transmitted without relying on a hybrid automatic repeat request (HARQ) triggering mechanism, thereby allowing the same TB to be transmitted multiple times over multiple transmission time intervals (TTIs). Depending on the number of repetitions transmitted and a TTI index at which the first repetition is transmitted, two or more repetitions of the TB may be transmitted in different TTIs of a slot of subframe, which may reduce the coherency between the repetitions and degrade the quality of the TB reception.

The described techniques provide for managing the transmission and reception of multiple repetitions of a TB transmission that extend across a slot, subframe, and/or eIMTA boundary. In this way, a UE and/or a base station can receive control information that explicitly or implicitly indicates an indication of transmission repetitions of a TB for a plurality of TTIs, identifies a quantity of transmission repetitions of the TB based on the received control information, and monitors for the transmission repetitions of the TB according to a configuration of the UE and/or the base station and based on whether the TB transmission repetitions extend across a slot, subframe, and/or eIMTA boundary. As explained herein, these techniques may result in improved repetition coherency of the transmitted TB.

Aspects of the disclosure are initially described in the context of a wireless communications system. Additional aspects of the disclosure are described with reference to an example configuration and process flow. Aspects of the disclosure are further illustrated by and described with reference to apparatus diagrams, system diagrams, and flowcharts that relate to repetition-based transmission.

Figure 1:
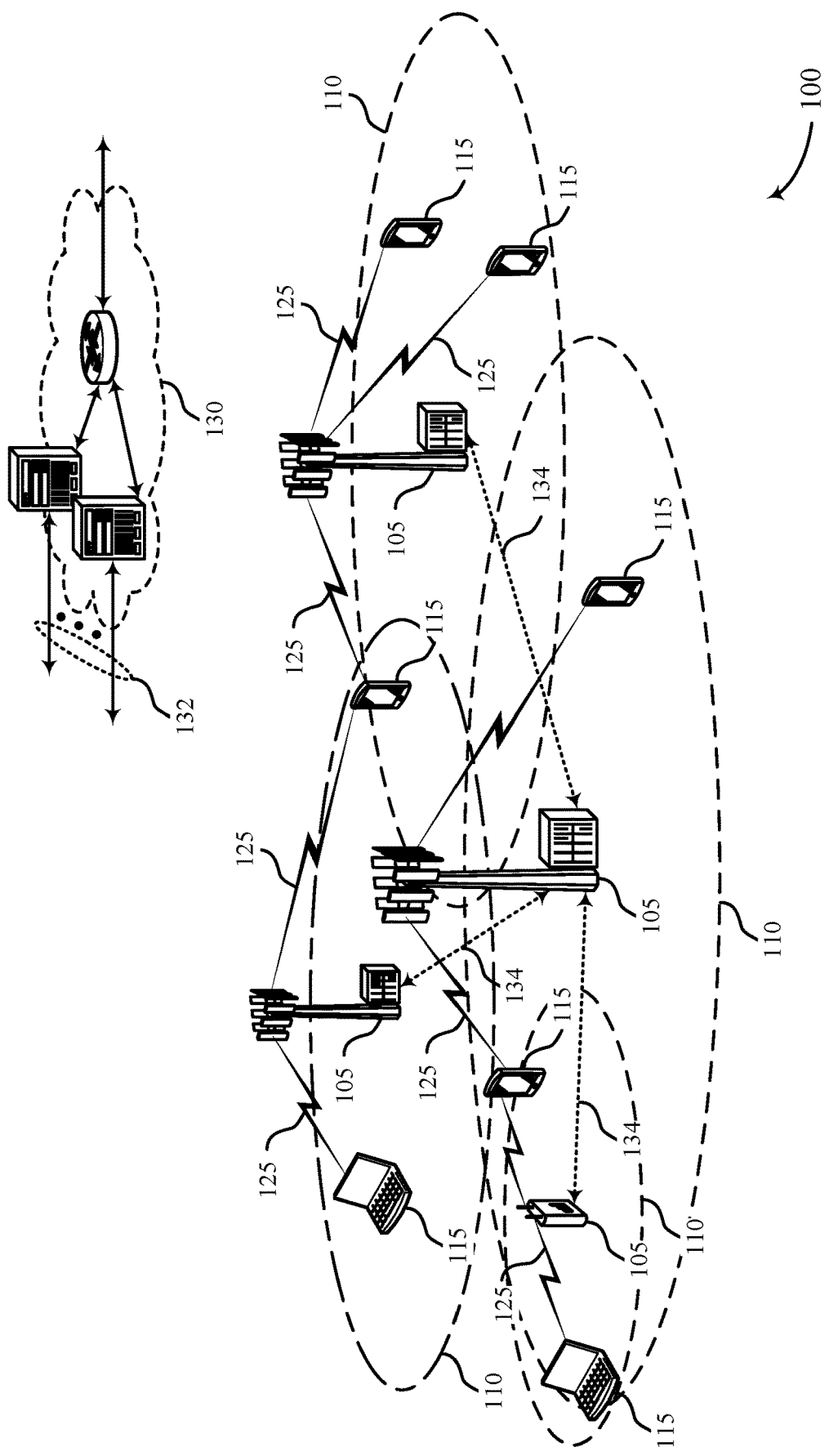
FIGS. 1 and 2 illustrate examples of a wireless communications system in accordance with aspects of the present disclosure.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some examples of the wireless communications system 100 may support a wireless device that may implement transmission repetitions of a same TB to meet a certain reliability threshold. For example, a base station 105 may handle downlink transmission repetitions of a same TB to meet a certain reliability threshold in ultra-reliable low latency communications (URLLC) systems. TBs may be transmitted in any TTI within a slot or subframe (e.g., based on when a packet becomes ready for transmission) in a URLLC system. For example, a TB may be transmitted multiple times to a UE 115. The base stations 105 and UEs 115 may implement processes to handle these TB repetitions near slot, subframe, or eIMTA boundaries. For example, the number of transmission repetitions for a TB may be based on a TTI index of a TTI used for an initial transmission of the TB. The quantity of repetitions corresponding to a TTI may be based on a proximity of a slot, a subframe, or an eIMTA boundary.

Legacy TDD systems may force all cells to use a same TDD configuration though it may have capability to use different configurations by changing a system information block (SIB) configuration (e.g., SIB1). In some cases, eIMTA may allow a cell or cluster of cells to dynamically adapt downlink/uplink subframe resources based on the actual traffic requirements. For example, a cell may use downlink configuration when downlink traffic is heavy (e.g., above a threshold) and vice versa. In some cases, for TDD eIMTA, these downlink/uplink subframe resources can be configured. For example, a baseline configuration (e.g., an uplink configuration) may be signaled in a SIB. In another example, downlink HARQ reference uplink/downlink configuration may be signaled using RRC. A device (e.g., base station 105 or UE 115, or both) may signal a dynamic configuration using L1 reconfiguration DCI. In some examples, uplink subframes and special subframes per SIB configuration may be dynamically reconfigured to downlink subframes. In some cases, a subframe configuration may include one or more anchor subframes and/or non-anchor subframes. An anchor subframe may be a common subframe for a baseline configuration and downlink HARQ reference configuration, while a non-anchor subframe may be adaptively changed between uplink and downlink directions based on L1 signaling.

In some cases, the reconfiguration DCI may carry information to explicitly indicate a possible uplink/downlink configuration. A DCI size may be aligned to a DCI format (e.g., DCI format 1C). The explicit reconfiguration DCI may be transmitted in a primary cell on PDCCH CSS or SCG CSS under DCI. A periodicity of the reconfiguration DCI may span 10, 20, 40, and/or 80 ms. A set of subframes for monitoring reconfiguration DCI may be device-specific configured via RRC. For example, for 20, 40, and 80 ms periodicity, subframes may correspond to subframes in a last radio frame within each periodicity. In case of TDD for a primary cell, downlink and special subframes per SIB can be configured for monitoring the reconfiguration DCI. In case of FDD for the primary cell, any subframe can be configured for monitoring the reconfiguration DCI.

In some cases, the reliability may be improved by allowing a repetition window to span across multiple slots or subframes. A base station 105 may schedule and indicate the transmission repetitions of a TB (e.g., a repetition factor K) for all TTIs within the repetition window to a UE 115 in control information (e.g., downlink control information (DCI)). A repetition window may refer to a time period spanning one or more TTIs in which a same TB is repeated. As each TTI may include a single TB transmission, a larger number of transmission repetitions may correspond to a longer repetition window (e.g., where the number of TTIs in the repetition window equals the number of TB transmission repetitions).

In some cases, a base station 105 may transmit the control information (e.g., in a grant) indicating the initial TTI index for the TB transmission to a UE 115, and the UE 115 may determine the quantity of transmission repetitions for the TB based on the TTI index or an explicit indication in the control information. For example, an information field inside a DCI may indicate the total number of repetitions i.e., K. In some cases, a base station 105 and/or a UE 115 may determine that a portion of the repetitions may extend across a slot, a subframe, or an eIMTA boundary. In this case, the base station 105 and/or the UE 115 may monitor for the portion of the repetitions extending across the boundary, accordingly. In some examples the total number of repetitions i.e., K may be defined based on whether the base station 105 and/or the UE 115 are configured to support the repetitions extending across a boundary. By supporting transmission repetitions of a TB, a base station 105 and/or a UE 115 may provide an efficient manner to enhance communication (e.g., reliability) and reduce latency in the wireless communications system 100.

Figure 2:
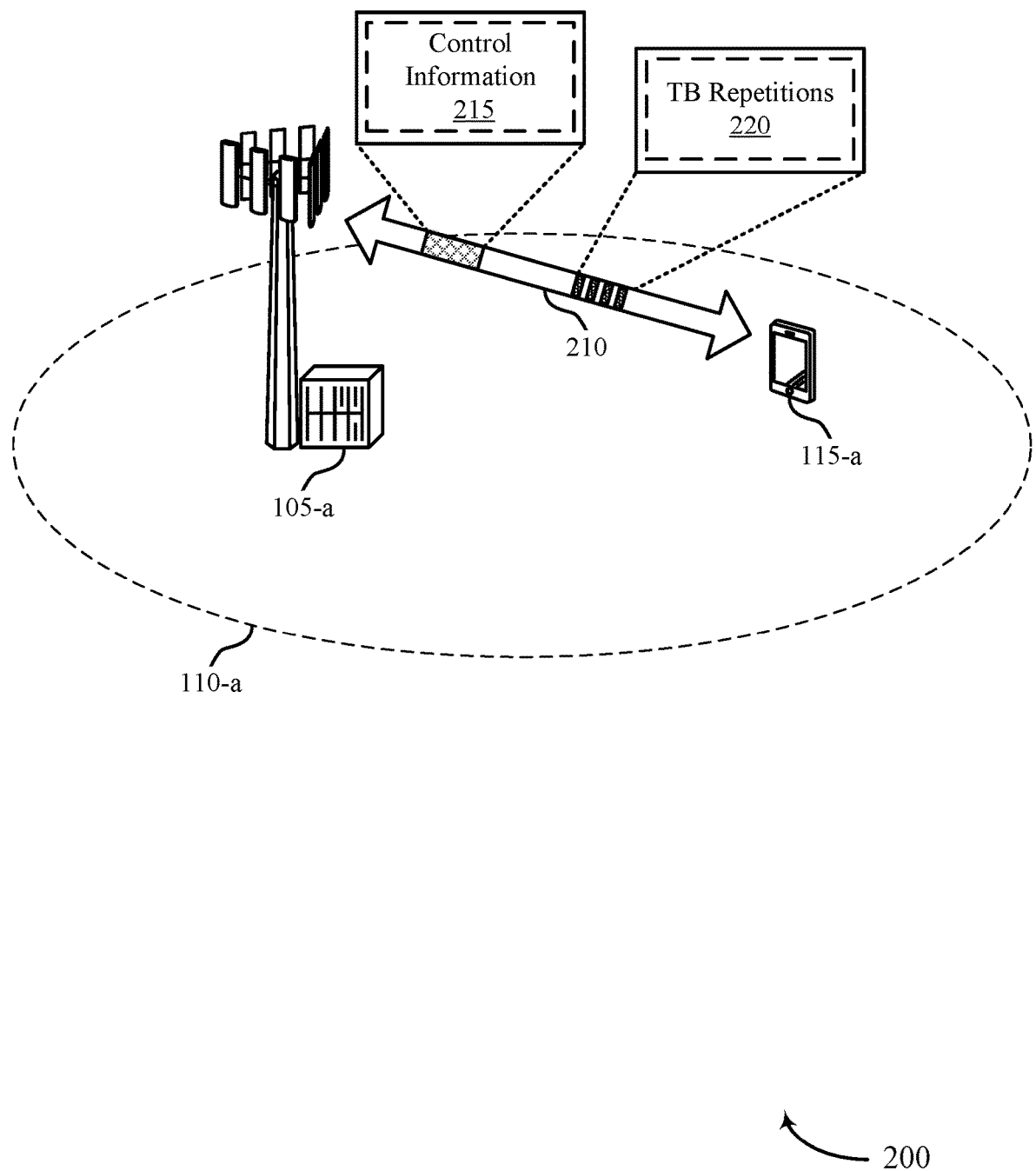

FIG. 2 illustrates an example of a wireless communications system 200 in accordance with various aspects of the present disclosure. For example, the wireless communications system 200 may support repetition-based transmission for downlink and uplink transmissions. In some examples, the wireless communications system 200 may implement aspects of the wireless communications system 100. The wireless communications system 200 may operate according to a radio access technology (RAT) such as 4G LTE or 5G NR, although techniques described herein may be applied to any RAT and to systems that may concurrently use two or more different RATs.

The wireless communications system 200 may include base station 105-*a* and UE 115-*a*, which may be examples of the corresponding devices described with respect to FIG. 1. The base station 105-*a* may provide service for a geographic area 110-*a* as described with respect to FIG. 1. In some examples, the wireless communications system 200 may also support transmission repetitions of a TB in an efficient manner to enhance communication (e.g., reliability) in the wireless communications system 200. For example, the wireless communications system 200 may be an LTE URLLC system or an NR URLLC system, etc., in which base station 105-*a* and/or UE 115-*a* support transmission repetitions of a TB.

In TB repetition, the base station 105-*a* and/or the UE 115-*a* may transmit same TB multiple times over multiple TTIs. In some cases, these TTIs may be referred to as shortened TTIs (sTTIs) or mini-slots, and may span any length of time (e.g., two symbols, three symbols, etc.). In some cases, for reduced latency, the base station 105-*a* and/or the UE 115-*a* may transmit a TB as soon as a packet is generated and ready for transmission in the TB. In these cases, the device may transmit a TB in any TTI within a slot of a subframe that supports data transmission (e.g., any subframe other than a control subframe in a downlink or any subframe in an uplink).

In some cases, depending on the TTI used for the initial TB transmission, transmitting a certain quantity of repetitions of the TB may result in the transmission repetitions crossing a defined boundary (e.g., a slot boundary, a subframe boundary, and/or an eIMTA boundary). In this case, when a transmission repetition extends across the defined boundary, the base station 105-*a* and/or the UE 115-*a* may or may not be able to keep a phase continuity. For example, different repetitions of the same transmission crossing such a boundary may result in complex multiplexing for longer channels for different repetitions of the TB. Such discrepancies may cause a loss of coherency between the repetitions. In some cases, this may impact the possibility for demodulation reference signal (DMRS) sharing or DMRS combining. Alternatively, for the eIMTA case, when a transmission repetition crosses an eIMTA boundary (e.g., from downlink to uplink), the phase continuity may not need to be maintained.

The wireless communications system 200 may support one or more repetition configurations for TBs for managing repeated transmissions that do cross these boundaries to handle these potential issues. The base station 105-*a* and/or the UE 115-*a* may be configured with the repetition configuration. A repetition configuration may indicate whether transmission repetitions of a TB can or cannot cross a boundary (e.g., slot, subframe, and/or eIMTA boundary). Thereby, the base station 105-*a* and/or the UE 115-*a* may handle repeated transmissions of a TB that do or do not cross these boundaries based on the repetition configuration. In some examples, the repetition configuration may be based on a device capability of the base station 105-*a* and/or the UE 115-*a*, in addition to its associated configuration signaling. Additionally, or alternatively, the repetition configuration may be based on whether DMRS sharing or DMRS combining across TTIs on either side of a boundary is provided. For example, the base station 105-*a* and/or the UE 115-*a* may be configured to transmit reference signals (e.g., demodulation reference signals (DMRSs)) on both sides of a boundary (e.g., within a repetition window) to support reception of the transmission repetitions 220.

In some cases, the base station 105-*a* and/or the UE 115-*a* may determine the transmission repetitions 220 of a TB, and schedule the TB to be transmitted in a specific TTI corresponding to a TTI index. The number of repetitions (i.e., a repetition factor, K) of this TB may be based on the TTI index. In some cases, the repetition factor K corresponding to a TTI may depend on slot boundaries, subframe boundaries, or eIMTA boundaries. For example, to avoid transmission repetitions crossing a boundary, a TTI index indicating a TTI close to a boundary for a subsequent TTI may correspond to a lower repetition factor than a TTI index indicating a TTI farther from the boundary for the subsequent TTI. The repetition factors may or may not depend on slot, subframes, and/or eIMTA boundaries. In some examples, a repetition factor K may depend on whether the base station 105-*a* and/or the UE 115-*a* are configured to handle repeated transmissions of a TB that do cross a boundary. The value of the repetition factor K may be pre-determined or dynamically configured, and may correspond to any number of TTIs (e.g., K may have a value of 1, 2, 3, 4, 5, 6, etc. or until an end of a slot or a subframe).

The base station 105-*a* may transmit control information 215, during a TTI, to the UE 115-*a* via bidirectional link 210, where the control information 215 indicates an indication of transmission repetitions 220 of a TB for multiple TTIs. The control information may include DCI transmitted on a physical downlink control channel (PDCCH) during the TTI. In some cases, this indication may be an explicit indication (e.g., a TTI value indicator) or an implicit indication (e.g., based on the timing of the control information 215, resources used for the control information 215, etc.). In some examples, the control information 215 may be part of a grant and may be an example of a dynamic grant, a semi-persistent scheduling grant, or a persistent scheduling grant. The grant may be for downlink or uplink resources.

The control information 215 may include an explicit indication of the quantity of transmission repetitions 220 for the TB corresponding to the TTI index. In other cases, the UE 115-*a* may determine the quantity of transmission repetitions 220 based on the received indication of the TTI index. The UE 115-*a* may determine a repetition window based on the TTI and the number of transmission repetitions. For example, because each repetition of the TB may be transmitted in a separate TTI, the repetition window may span a number of TTIs equal to the number of transmission repetitions (and, correspondingly, equal to the value of the repetition factor), and may start with the TTI corresponding to the TTI index for the initial TB transmission. The UE 115 may then monitor for the transmission repetitions 220 of the TB based on the quantity of transmission repetitions of the TB and/or the repetition window.

The UE 115-*a* may identify a TTI index for an initial transmission associated with the transmission repetitions 220 of the TB, and determine that a portion of the transmission repetitions 220 extend across a subframe, slot, and/or eIMTA boundary based on the TTI index and the received control information. In this case, the UE 115-*a* may monitor for the transmission repetitions 220 of the TB based on determining whether it is configured to handle repeated transmissions of a TB that does cross one of these boundaries based on the repetition configuration (e.g., UE-capability). In some examples, this determination may be implicit or explicit. For example, the UE 115-*a* may identify that it is not configured to support transmission repetitions 220 that extend across a boundary based on the identified UE-capability. In some cases, a portion of the transmission repetitions 220 may extend across an uplink portion of a special switching subframe (SSF) associated with a subframe, or an uplink subframe in case of a downlink transmission repetitions. In this case, the base station 105-*a* may indicate in a DCI a reconfiguration of a subframe reconfiguration to the UE 115-*a*. Additionally or alternatively, the UE 115-*a* may utilize repetition windows that cross subframe boundaries. For example, the UE 115-*a* may increase the transmission reliability by allowing repetition windows to span across more than one subframe, increasing the number of transmission repetitions of the TB. To improve the reception reliability, the UE 115-*a* may transmit reference signals (e.g., DMRSs) on either side of the boundary if a repetition window spans across the boundary.

Figure 3A:
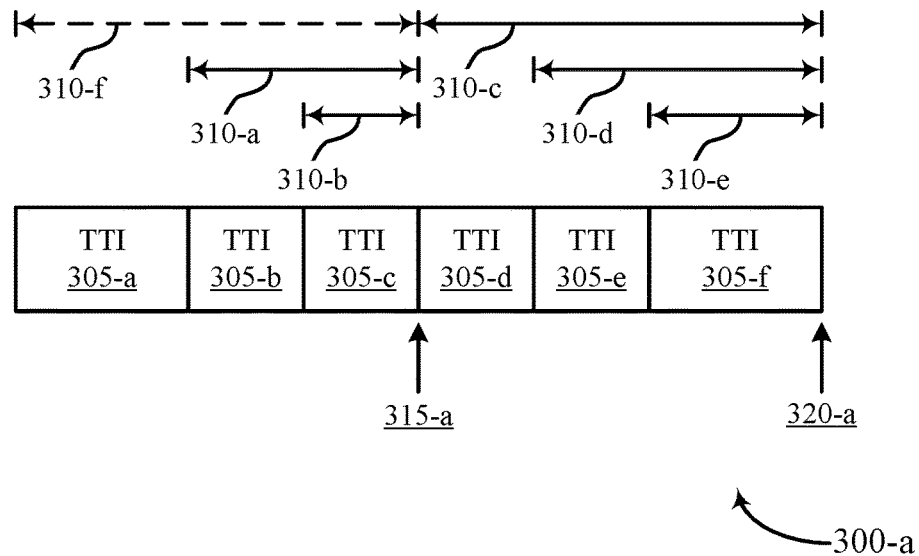
FIGS. 3A and 3B illustrate examples of a configuration in accordance with aspects of the present disclosure.

FIG. 3A illustrates an example of a configuration 300-*a* in accordance with aspects of the present disclosure. In some examples, the configuration 300-*a* may implement aspects of the wireless communications systems 100 and 200. For example, the configuration 300-*a* may support TB repetition handling for downlink and uplink transmissions. The configurations 300-*a* may illustrate examples of repetition windows 310 for transmission repetitions 220 of TBs in an uplink or downlink, where the repetition windows 310 may be constrained to a single subframe. As illustrated, a subframe may span two slots and contain six TTIs 305 configured in a 3-2-2-2-2-3 pattern, which may define the respective number of OFDM symbols in each TTI of the subframe. The 3-2-2-2-2-3 pattern may be used to prevent one of the TTIs 305 from spanning a boundary 315-*a*, which may be a slot boundary, a subframe boundary, or an eIMTA boundary, or a combination thereof. In some examples, one or more of the TTIs 305 may be an anchor TTI or a non-anchor TTI. In addition, a portion of the TTIs 305 may be allocated for downlink transmission, a second portion of the TTIs 305 may be allocated for uplink transmission, and a third portion of TTIs 305 may be allocated for downlink/uplink reconfiguration (e.g., a special TTI/subframe).

Each repetition window 310 may correspond to a TTI 305 (e.g., based on the TTI index). If an initial TB transmission occurs in a given TTI 305, the base station 105-*a* and/or the UE 115-*a* may determine the quantity of transmission repetitions 220 to perform for the TB based on the TTI index for this initial transmission. The repetition windows 310 configured for each TTI 305 may be further based on the boundary 315-*a* (e.g., slot boundary or eIMTA boundary) and another boundary 320-*a* (e.g., a subframe boundary). For example, if an initial transmission of a TB is scheduled for TTI 305-*b*, the base station 105-*a* and/or the UE 115-*a* may identify the corresponding repetition window 310-*a* for transmission repetitions 220 of the TB based on the TTI index of TTI 305-*b*. In some cases, the term "transmission repetitions" may refer to every transmission of the TB in the repetition process (e.g., including the initial transmission).

Repetition window 310-*a* may span TTI 305-*a*, TTI 305-*b*, TTI 305-*c*, and TTI 305-*d*, corresponding to a repetition factor of K=4. The repetition factor K may indicate the number of transmissions of the same TB for the base station 105-*a* and/or the UE 115-*a* to perform, where the value of K is equal to the number of TTIs 305 spanned by the repetition window 310. In the scenario described above, the base station 105-*a* and/or the UE 115-*a* may initially transmit a TB in TTI 305-*b*, and may transmit the same TB again in TTI 305-*c*, etc. Repetition window 310-*a* may stop at TTI 305-*c* due to the boundary 315-*a*. Repetition windows 310 for the other TTI indexes may be defined in a similar manner. For example, TTI 305-*c* may correspond to repetition window 310-*b* with a K value of 1, TTI 305-*d* may correspond to repetition window 310-*c* with a K value of 3 (e.g., where the repetition window 310 ends based on the boundary 320-*a*), TTI 305-*e* may correspond to repetition window 310-*d* with a K value of 2, and TTI 305-*f* may correspond to repetition window 310-*e* with a K value of 1. These repetition factors K for the given repetition windows 310 are provided as examples, and other K values may be implemented for repetition windows 310 corresponding to certain TTI indexes.

In some cases where a boundary (e.g., the boundary 315-*a* and/or the boundary 320-*a*) cannot be crossed, the UE 115-*a* may determine that there are not sufficient TTIs 305 remaining until an end of a subframe. For example, the UE 115-*a* may receive control information including an indication of transmission repetitions 220 of a TB during TTI 305-*c* where the repetition factor K value is 4. As such, the UE 115-*a* may only expect to receive three transmission repetitions (e.g., for TTI 305-*d*, TTI 305-*e*, and TTI 305-*f*). Additionally, in this case, the UE 115-*a* may determine how to handle the transmission repetitions 220 that extend across the boundary 320-*a* (e.g., slot boundary and/or eIMTA boundary). For example, the UE 115-*a* may determine a quantity of available TTIs 305 for the transmission repetitions 220 of the TB and monitor for the transmission repetitions 220 based on the quantity of available TTIs 305. The UE 115-*a* may determine that the quantity of available TTIs 305 is below the plurality of TTIs for the quantity of transmission repetitions 220 of the TB, and suspend monitoring at least one TTI of the plurality after an ultimate TTI 305 of the quantity of available TTIs 305.

In some cases, the UE 115-*a* may not expect to receive control information (e.g., DCI) indicating a K value that requires crossing a boundary (e.g., slot boundary and/or eIMTA boundary) based on its configuration, and as such may allow transmission repetitions 220 to go on until an end of a subframe or an eIMTA. In some cases, where TTI 305 may be subframes, the base station 105-*a* and/or the UE 115-*a* may determine that a portion of transmission repetitions 220 of a TB may extend across an uplink part of an SSF, an uplink subframe. In the case that the base station 105-*a* performs this determination, it may transmit a dynamic configuration using L1 reconfiguration DCI to the UE 115-*a* indicating that a subframe configuration may change, for example, a downlink subframe may change to an uplink subframe. Additionally, the base station 105-*a* and/or the UE 115-*a* may allow transmission repetitions 220 to go on until an end of the uplink subframe.

Figure 3B:
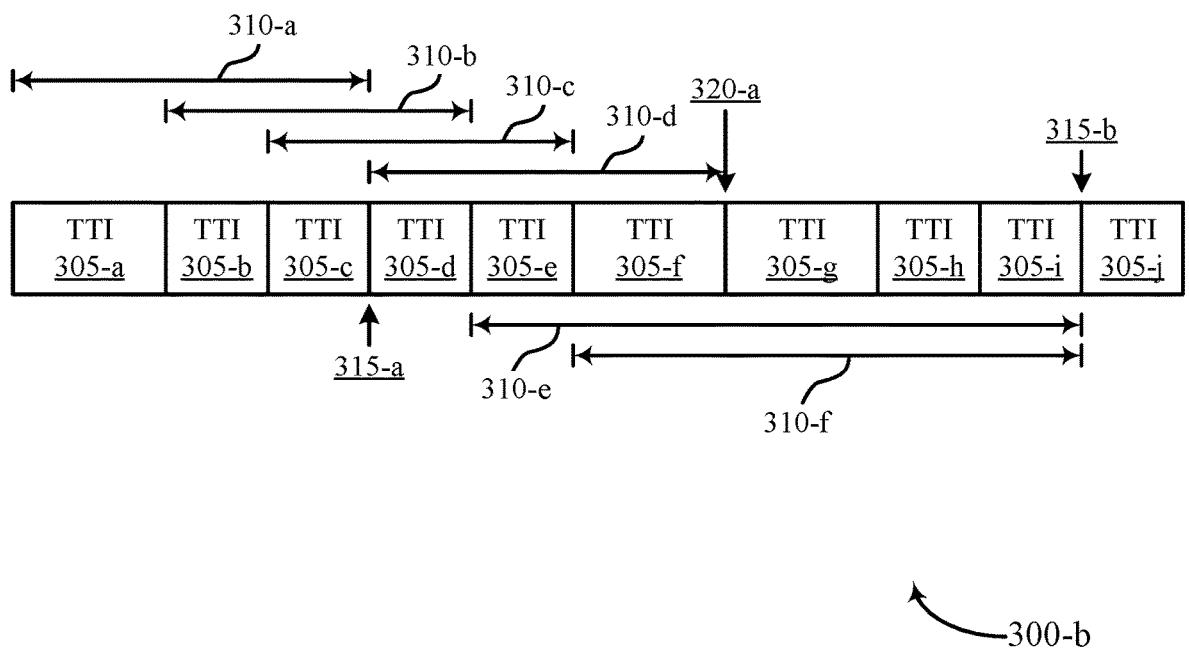

FIG. 3B illustrates an example of a configuration 300-*b* in accordance with aspects of the present disclosure. In some examples, the configuration 300-*b* may implement aspects of the configuration 300-*a*. In some examples, the configuration 300-b may implement aspects of the wireless communications systems 100 and 200. For example, the configuration 300-b may support TB repetition handling for downlink and uplink transmissions. The configurations 300-b may illustrate examples of repetition windows 310 for transmission repetitions 220 of TBs in an uplink or downlink, where the repetition windows 310 may be span one or more TTIs.

In some cases, the base station 105-a and/or the UE 115-a may determine that a portion of the transmission repetitions 220 extend across the boundary 315-a and/or the boundary 315-b (e.g., a slot boundary or an eIMTA boundary, or both) based at least in part on the TTI index of the initial transmission and the received control information. The UE 115-a may also identify that it is configured to support extending across the boundary 315-a and/or the boundary 315-b. If crossing the boundary 315-a and/or the boundary 315-b is allowable, the base station 105-a and/or the UE 115-a may determine a TTI pattern in a next subframe and/or eIMTA. For example, the base station 105-a and/or the UE 115-a may identify a quantity of available TTIs 305 (e.g., 305-j) in a second slot of a second subframe, occurring after the boundary 315-a and/or the boundary 315-b.

In some cases, the base station 105-a and/or the UE 115-a may not expect for a portion of the transmission repetitions 220 to extend across the boundary 315-a and/or the boundary 315-b (e.g., a slot boundary or an eIMTA boundary, or both), for example, based at least in part on a specification configuration and/or the capability of the base station 105-a and/or the UE 115-a. In some examples, the base station 105-a and/or the UE 115-a may determine that a physical downlink shared channel (PDSCH) is not mapped to resources of a TTI 305 in a second slot and/or a second subframe based on the quantity of available TTIs. As a result, the base station 105-a and/or the UE 115-a may puncture the TTI (e.g., TTI 305-j) based on the PDSCH not being mapped to the TTI, and monitor the portion of the transmission repetitions based on the puncturing. For example, the UE 115-a may receive a repetition factor K that may have a value that requires a portion of the transmission repetitions 220 to extend across the boundary 315-a and/or the boundary 315-b, the UE 115-a may then assume that a last transmission is over a last TTI 305 of a current subframe, i.e., other transmission on the other side of the boundary 315-a and/or the boundary 315-b may be punctured.

In some cases, the base station 105-a and/or the UE 115-a may determine whether an initial TTI associated with the TTI index is available for the initial transmission associated with the transmission repetitions 220 of the TB. In some examples, the UE 115-a may receive a control format indicator (CFI) transmitted via RRC that may indicate that TTI 305-d is configured for control channel signaling. For example, a value of "1" in a field of a CFI may indicate that the initial TTI associated with the TTI index is available for transmissions, while a value of "2" in the field of the CFI may indicate that the initial TTI is unavailable for transmissions. In this case, the initial TB transmissions may not occur in TTI 305-d, and no repetition window 310 may be defined to correspond to this TTI index. As such, the UE 115-a may postpone the initial transmission associated with the transmission repetitions 220 of the TB to a later TTI, for example, TTI 305-e.

In some cases, the UE 115-a may be expected to receive remaining PDSCH starting right after the TTI 305-d. Alternatively, the UE 115-a may puncture the transmission and monitor for a subsequent transmission repetition 220 during a following TTI. In this case, the repetition factor K may be K−1. The UE 115-a may determine whether to postpone or puncture the initial transmission based on whether the CFI is indicated dynamically or semi-statically. For example, the UE 115-a may receive the CFI on a physical control format indicator channel (PCFICH) or via higher layer signaling, and determine to postpone or puncture the initial transmission based on whether the CFI is indicated dynamically or semi-statically.

By supporting transmission repetitions of a TB, the base station 105-a and/or the UE 115-a may provide an efficient manner to enhance reliability and reduce latency in the wireless communications system 200. For grant-based uplink TB transmission repetitions, similar processes may be performed as described above for the downlink.

Figure 4:
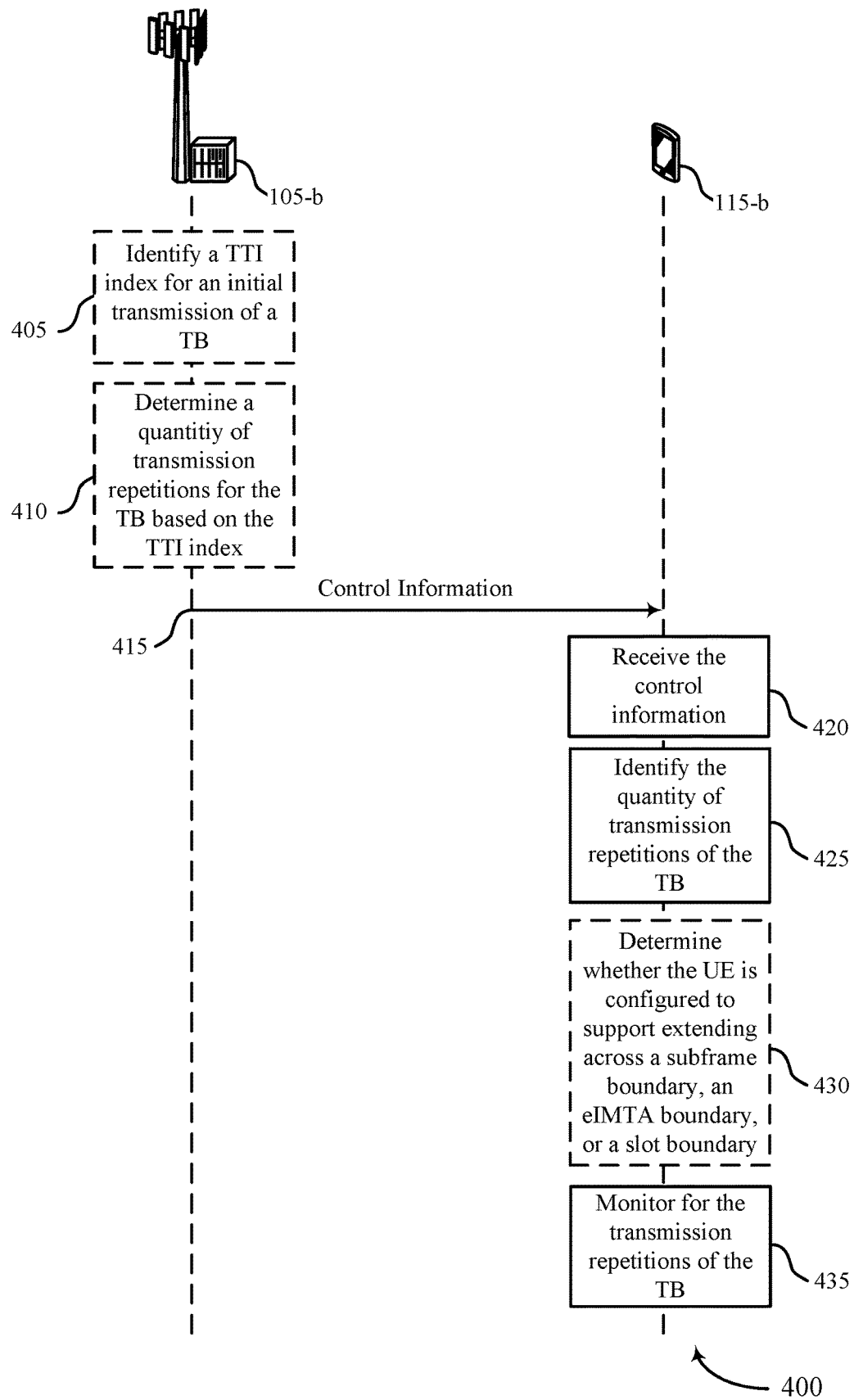
FIG. 4 illustrates an example of a process flow in accordance with aspects of the present disclosure.

FIG. 4 illustrates an example of a process flow 400 in accordance with aspects of the present disclosure. In some examples, the process flow 400 may implement aspects of the wireless communications system 100 and 200. The process flow 400 may also support transmission repetitions of a TB for downlink and uplink transmissions in an efficient manner to enhance communication (e.g., reliability) and reduce latency in a wireless communications system. Base station 105-b and UE 115-b may be examples of the corresponding devices described with reference to FIGS. 1 and 2.

In the following description of the process flow 400, the operations between the base station 105-b and the UE 115-b may be transmitted in a different order than the exemplary order shown, or the operations performed by the base station 105-b and the UE 115-b may be performed in different orders or at different times. Certain operations may also be left out of the process flow 400, or other operations may be added to the process flow 400.

In some examples, the process flow 400 may commence with the base station 105-b establishing a connection with the UE 115-b (e.g., performing a cell acquisition procedure, a random access procedure, an RRC connection procedure, an RRC configuration procedure). The base station 105-b may send grants (e.g., in control information) to the UE 115-b to schedule either uplink or downlink transmission repetitions for a TB, as part of the connection establishment.

At 405, the base station 105-b may optionally identify a TTI index for an initial transmission of a TB. The TB may be an example of an uplink TB or a downlink TB, and the TTI may be, additionally or alternatively, part of a slot of a subframe. In some examples, the TTI may be an sTTI. At 410, the base station 105-b may also optionally determine a quantity of transmission repetitions for the TB based on the TTI index. In some cases, the correlation between the number of transmission repetitions and the TTI index may be based on a slot boundary, a subframe boundary, an eIMTA boundary, or a combination thereof.

At 415, the base station 105-b may transmit control information to the UE 115-b. For example, the base station 105-b may transmit a grant to the UE 115-b. This grant may be an example of a downlink grant or an uplink grant. The grant may indicate resources to use for TB transmission or TB reception, including an indication of transmission repetitions (e.g., the repetition factor K) of a TB for a plurality of TTIs, or of the TTI index for the initial transmission of the TB, or both. In some examples of eIMTA, the wireless communications systems as described herein may determine whether repetitions in downlink can extend across an uplink subframe. The techniques describe herein for TB repetitions crossing a boundary (e.g., slot boundary, subframe boundary) may similarly be performed for downlink subframes, special subframes, uplink subframes, etc. (e.g., DSUD subframes). For example, if the base station 105-*b* and/or the UE 115-*b* are providing transmission repetitions using DSUD subframes, and a portion of the transmission repetitions needs to cross an uplink part of an uplink subframe to reach the next downlink subframe, the base station 105-*b* and/or the UE 115-*b* may support techniques describe herein for TB repetitions crossing a boundary (e.g., slot boundary, subframe boundary) and apply it to DSUD subframes (e.g., such as puncturing delaying, etc. a transmission repetition).

At 420, the UE 115-*b* may receive the control information from the base station 105-*b*. At 425, the UE 115-*b* may identify the quantity of transmission repetitions of the TB. The identification may be based on the received control information. At 430, the UE 115-*b* may optionally determine whether the UE 115-*b* is configured to support extending across a subframe boundary, an eIMTA boundary, or a slot boundary, or a combination thereof.

At 435, the UE 115-*b* may monitor for the transmission repetitions of the TB, for example, based on the identified quantity of transmission repetitions and/or the determination of whether the UE 115-*b* is configured to support extending across a boundary (i.e., a subframe boundary, an eIMTA boundary, or a slot boundary, or a combination thereof). In some examples, the UE 115—may monitor for the transmission repetitions of the TB based on the TTI index and the determined number of transmission repetitions. For example, UE 115-*b* may monitor in a repetition window starting with the TTI corresponding to the indicated TTI index, and spanning a number of TTIs equal to the determined number of transmission repetitions. A repetition window may refer to a time period spanning one or more TTIs in which a same TB is repeated. As each TTI may contain a single TB transmission, a larger number of transmission repetitions may correspond to a longer repetition window (e.g., where the number of TTIs in the repetition window equals the number of TB transmission repetitions). In some examples, the UE 115-*b* may receive the TB based on receiving one or more downlink transmission repetitions of the TB during the monitoring process. Alternatively, the UE 115-*b* may transmit uplink transmission repetitions of the TB based on the TTI index and the identified number of transmission repetitions, for which the base station 105-*b* may monitor for these TB repetitions in the repetition window defined by the initial TTI and the number of transmission repetitions.

Figure 5:
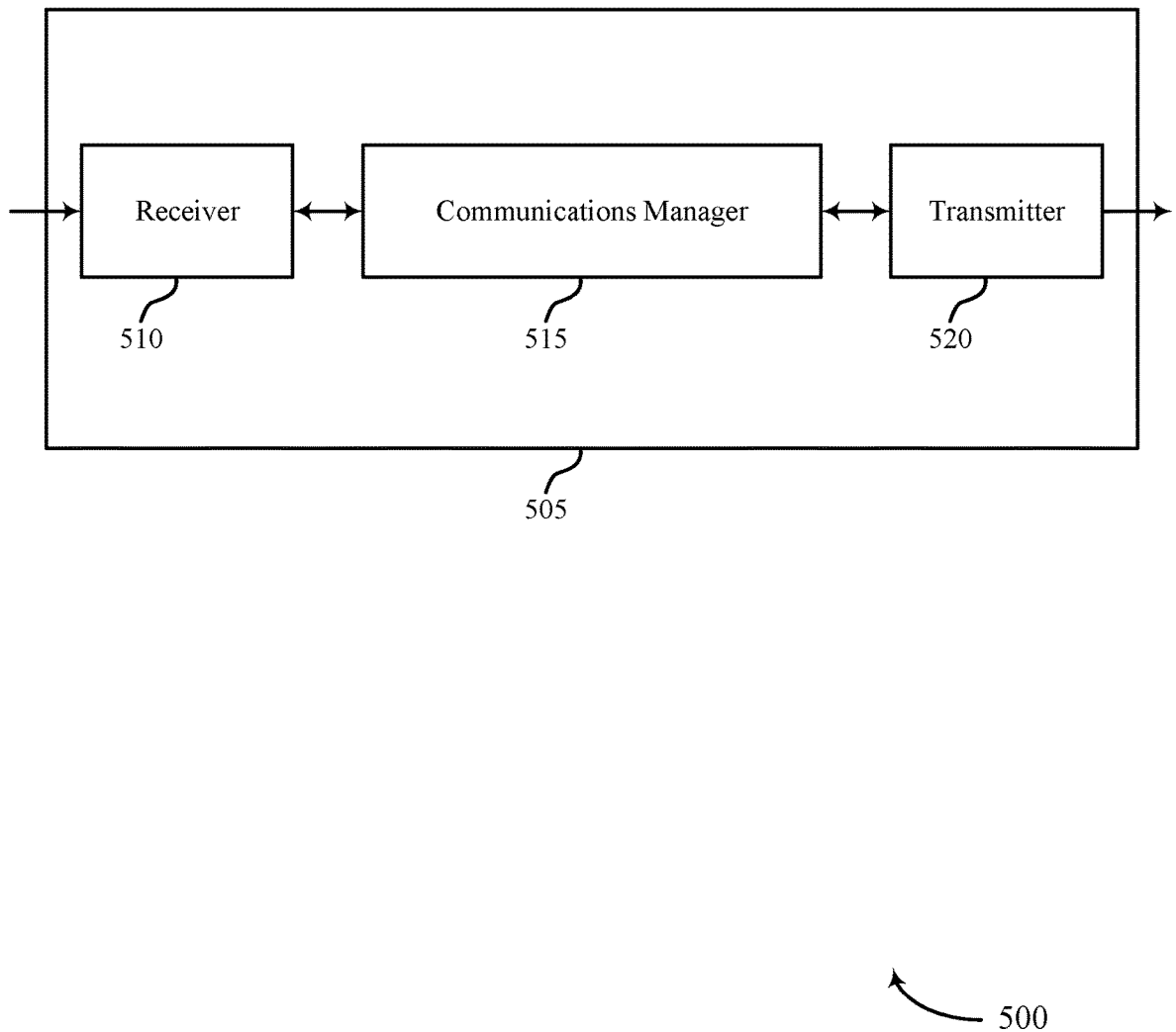
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a device as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to more details on supporting repetition-based transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, during a TTI of a subframe, control information including an indication of transmission repetitions of a TB for a set of TTIs, identify a quantity of transmission repetitions of the TB based on the control information, and monitor for the transmission repetitions of the TB based on the identifying. The communications manager 515 may be an example of aspects of the communications manager 810 described herein.

The device 505 or any other device described herein (e.g., a UE 115) may beneficially support repetition based transmission as described herein. For example, the device 505 may manage the transmission, reception, or both, of multiple repetitions of a TB transmission, which may result in improved repetition coherency of the transmitted TB.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
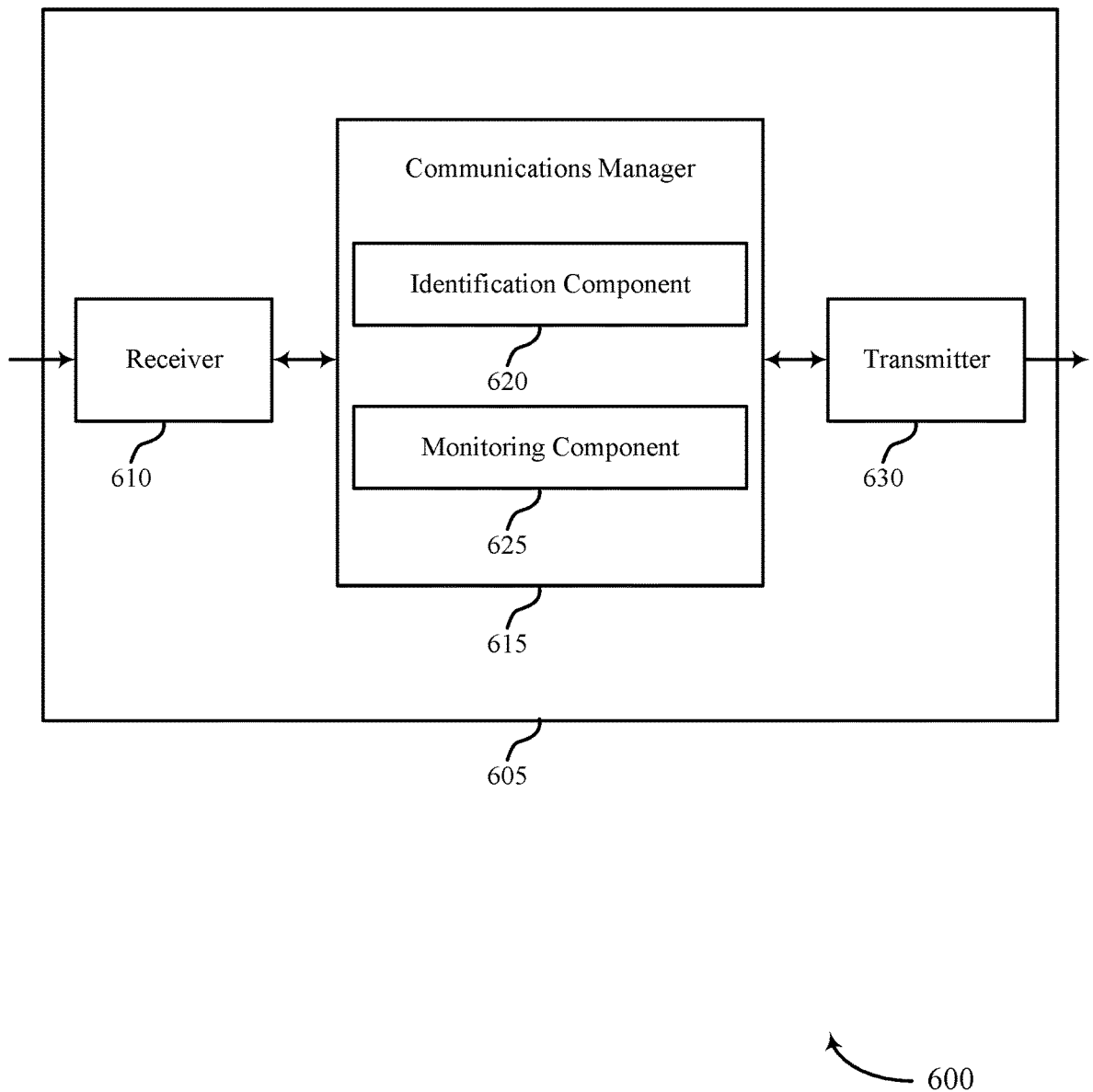

FIG. 6 shows a block diagram 600 of a device 605 in accordance with aspects of the present disclosure. The device 605 may be an example of aspects of a device 505 or a device 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to more details on supporting repetition-based transmission, etc.). For example, the receiver 610 may receive, during a TTI of a subframe, control information including an indication of transmission repetitions of a TB for a set of TTIs. Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an identification component 620 and a monitoring component 625. The communications manager 615 may be an example of aspects of the communications manager 810 described herein. The identification component 620 may identify a quantity of transmission repetitions of the TB based on the control information. The monitoring component 625 may monitor for the transmission repetitions of the TB based on the identifying.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 635 may utilize a single antenna or a set of antennas.

Figure 7:
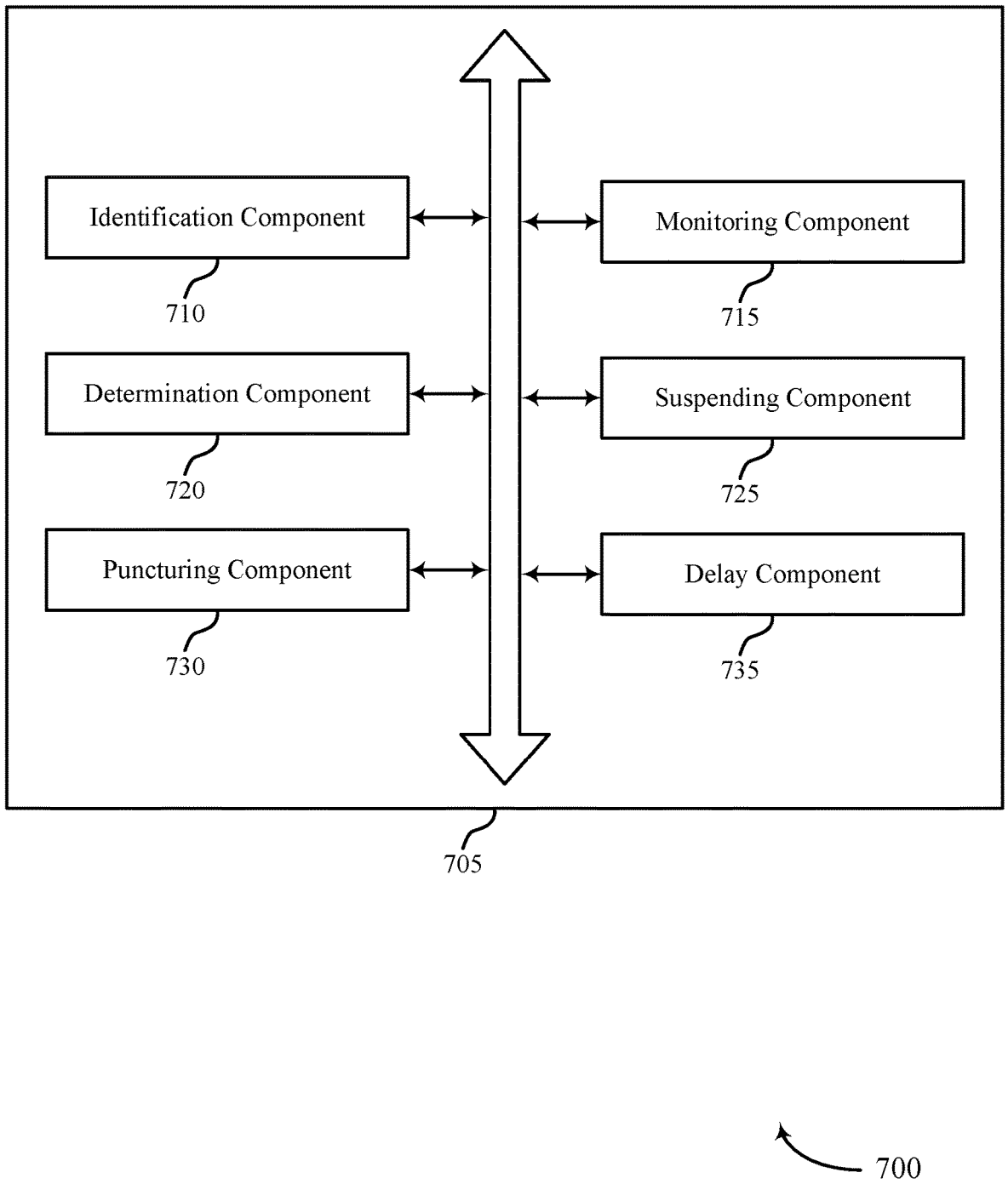
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include an identification component 710, a monitoring component 715, a determination component 720, a suspending component 725, a puncturing component 730, and a delay component 735. Each of these modules may communicate, directly or indirectly, with one another (e.g., via one or more buses).

In some examples, the identification component 710 may identify a value in a field of a CFI associated with the control information. In some examples, the value in the field of the CFI may be 2. In some examples, the identification component 710 may identify a configuration of a wireless device (e.g., a device 505, a device 605, or a UE 115). In some examples, identifying the configuration may be based on a capability of the wireless device. The capability may include a DMRS sharing capability, a DMRS combining capability, a configuration signaling, or an indication of the DMRS sharing capability or the DMRS combining capability relative to TTIs on each side of a subframe boundary, or a combination thereof.

In some examples, the identification component 710 may identify that the device 505, the device 605, or a device as described herein is not configured to support extending across the subframe boundary or the slot boundary based on the configuration. In some examples, the identification component 710 may identify that the device 505, the device 605, or a device as described herein is configured to support extending across the subframe boundary or the slot boundary based on the configuration. In some examples, the identification component 710 may identify a quantity of available TTIs in a second slot of a second subframe based on the device 505, the device 605, or a device as described herein being configured to support extending across the subframe boundary or the slot boundary.

In some examples, the identification component 710 may identify a TTI index for an initial transmission associated with the transmission repetitions of the TB. In some examples, the identification component 710 may identify a value in a field of a CFI associated with the control information, where determining whether the initial TTI is available for the initial transmission is further based on the value in the field of the CFI.

In some examples, the identification component 710 may identify that the device 505, the device 605, or a device as described herein is not configured to support extending across an eIMTA boundary based on the configuration, where monitoring for the transmission repetitions of the TB further includes suspending monitoring a portion of the transmission repetitions occurring after the eIMTA boundary based on the device 505, the device 605, or a device as described herein not being configured to support extending across the eIMTA boundary. In some examples, the identification component 710 may identify that the device 505, the device 605, or a device as described herein is configured to support extending across the eIMTA boundary based on the configuration, where monitoring for the transmission repetitions of the TB further includes monitoring for the portion of the transmission repetitions occurring after the eIMTA boundary based on the device 505, the device 605, or a device as described herein being configured to support extending across the eIMTA boundary. In some examples, the identification component 710 may identify a quantity of available TTIs in a second slot of a second subframe based on the device 505, the device 605, or a device as described herein being configured to support extending across the eIMTA boundary.

The monitoring component 715 may monitor for the transmission repetitions of the TB based on the identifying. In some examples, the monitoring component 715 may monitor the portion of the transmission repetitions extending across the subframe boundary or the slot boundary based on the configuration. In some examples, the monitoring component 715 may monitor the portion of the transmission repetitions during the second slot of the second subframe based on the puncturing. In some examples, the monitoring component 715 may monitor for a subsequent TB transmission of the quantity of transmission repetitions during a second TTI after the initial TTI. In some examples, the monitoring component 715 may monitor the portion of the transmission repetitions extending across the eIMTA boundary based on the configuration.

In some examples, the monitoring component 715 may monitor a PDSCH for the transmission repetitions of the TB. The determination component 720 may determining that a second TTI is not available for transmitting one of the transmission repetitions of the TB based at least in part on the value in the field of the CFI. In some examples, the second TTI may be a mini-slot. In some examples, the determination component 720 may enable a wireless device (e.g., a device 505, a device 605, or a UE 115) to realize one or more of the advantages described herein. For example, the determination component 720 may enable a wireless device to avoid monitoring the second TTI, which may result in lower computational complexity, beneficial power savings, among other advantages.

In some examples, the determination component 720 may determine whether the device 505, the device 605, or a device as described herein is configured to support extending across a subframe boundary or a slot boundary based on the configuration. In some examples, the determination component 720 may determine that a portion of the transmission repetitions extend across the subframe boundary or the slot boundary based on the TTI index of the initial transmission and the control information.

In some examples, the determination component 720 may determine a quantity of available TTIs for the transmission repetitions of the TB based on the device 505, the device 605, or a device as described herein not being configured to support extending across the subframe boundary or the slot boundary. In some examples, the determination component 720 may determine that the quantity of available TTIs is below the set of TTIs for the quantity of transmission repetitions of the TB. In some examples, the determination component 720 may determine that a portion of the transmission repetitions extend across the subframe boundary or the slot boundary based on the TTI index of the initial transmission and the control information. In some examples, the determination component 720 may determine that a PDSCH is not mapped to resources of a TTI in the second slot of the second subframe based on identifying the quantity of available TTIs.

In some examples, the determination component 720 may determine whether an initial TTI associated with the TTI index is available for the initial transmission associated with the transmission repetitions of the TB based on the control information. In some examples, the determination component 720 may determine that the initial TTI associated with the TTI index is unavailable for the initial transmission based on the value in the field of the CFI. In some examples, the determination component 720 may determine that the initial TTI associated with the TTI index is unavailable for the initial transmission based on the value in the field of the CFI.

In some examples, the determination component 720 may determine whether the device 505, the device 605, or a device as described herein is configured to support extending across an eIMTA boundary based on the configuration. In some examples, the determination component 720 may determine a subframe configuration of the subframe based on the control information. In some examples, the determination component 720 may determine that a portion of the transmission repetitions extend across the eIMTA boundary based on the subframe configuration.

In some examples, the determination component 720 may determine a quantity of available TTIs for the transmission repetitions of the TB based on the device 505, the device 605, or a device as described herein not being configured to support extending across the eIMTA boundary, where monitoring for the transmission repetitions of the TB is further based on the quantity of available TTIs. In some examples, the determination component 720 may determine that a portion of the transmission repetitions extend across the eIMTA boundary based on the TTI index of the initial transmission and the control information. In some examples, the determination component 720 may determine to monitoring for the transmission repetitions of the TB until an ultimate TTI of the quantity of available TTIs based at least in part on an indication received in a DCI.

In some examples, the determination component 720 may determine that the portion of the transmission repetitions extend across an uplink portion of a special switching subframe (SSF) associated with the subframe configuration, where monitoring for the transmission repetitions of the TB further comprises suspending monitoring the portion of the transmission repetitions occurring after the uplink portion of the SSF based at least in part on the wireless device not being configured to support extending across the SSF. In some examples, the determination component 720 may determine that the portion of the transmission repetitions extend across an uplink subframe associated with the subframe configuration, where the transmission repetitions are in a downlink transmission and monitoring for the transmission repetitions of the TB further comprises suspending monitoring the portion of the transmission repetitions occurring after the uplink subframe based at least in part on the wireless device not being configured to support extending across the uplink subframe.

In some examples, the determination component 720 may determine that the portion of the transmission repetitions extend across an uplink portion of a SSF associated with the subframe configuration, where monitoring for the transmission repetitions of the TB further comprises delaying or puncturing a subframe following the SSF for monitoring the portion of the transmission repetitions occurring after the uplink portion of the SSF based at least in part on the wireless device being configured to support extending across the SSF. In some examples, the determination component 720 may determine that the portion of the transmission repetitions extend across an uplink subframe associated with the subframe configuration, where the transmission repetitions are in a downlink transmission and monitoring for the transmission repetitions of the TB further comprises delaying or puncturing a subframe following the uplink subframe for monitoring the portion of the transmission repetitions occurring after the uplink subframe based at least in part on the wireless device being configured to support extending across the uplink subframe.

The suspending component 725 may suspend monitoring at least one TTI of the set after an ultimate TTI of the quantity of available TTIs. The puncturing component 730 may puncture the TTI in the second slot of the second subframe based on the PDSCH not being mapped to the TTI. In some examples, the puncturing component 730 may puncture the initial TTI based on determining that the initial TTI is unavailable. In some examples, the puncturing component 730 may puncture the TTI in the second slot of the second subframe based on the PDSCH not being mapped to the TTI. The delay component 735 may delay the initial transmission to a second TTI after the initial TTI.

Figure 8:
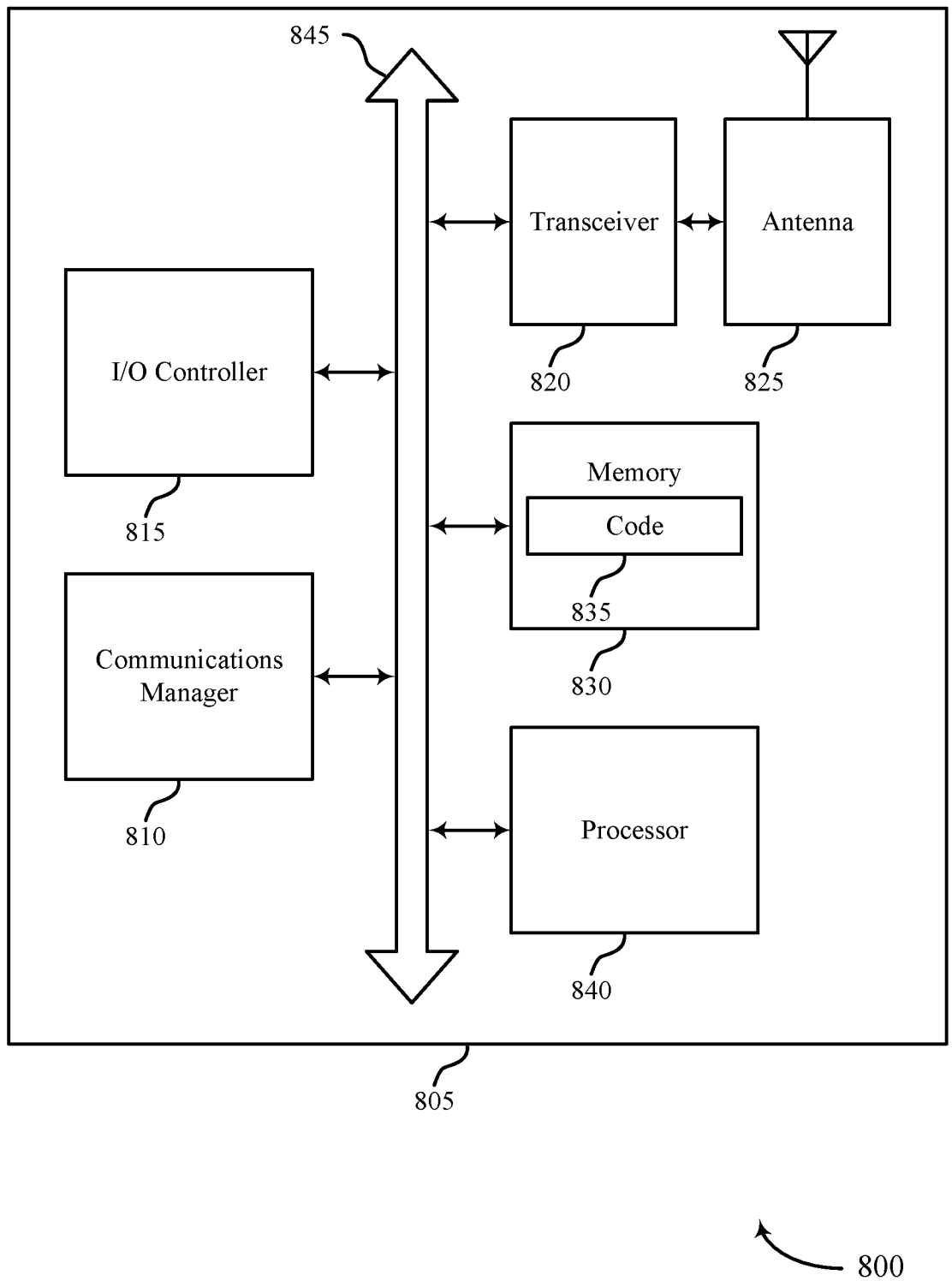
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a device as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, during a TTI of a subframe, control information including an indication of transmission repetitions of a TB for a set of TTIs, identify a quantity of transmission repetitions of the TB based on the control information, and monitor for the transmission repetitions of the TB based on the identifying.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting more details on supporting repetition-based transmission for downlink and/or uplink).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
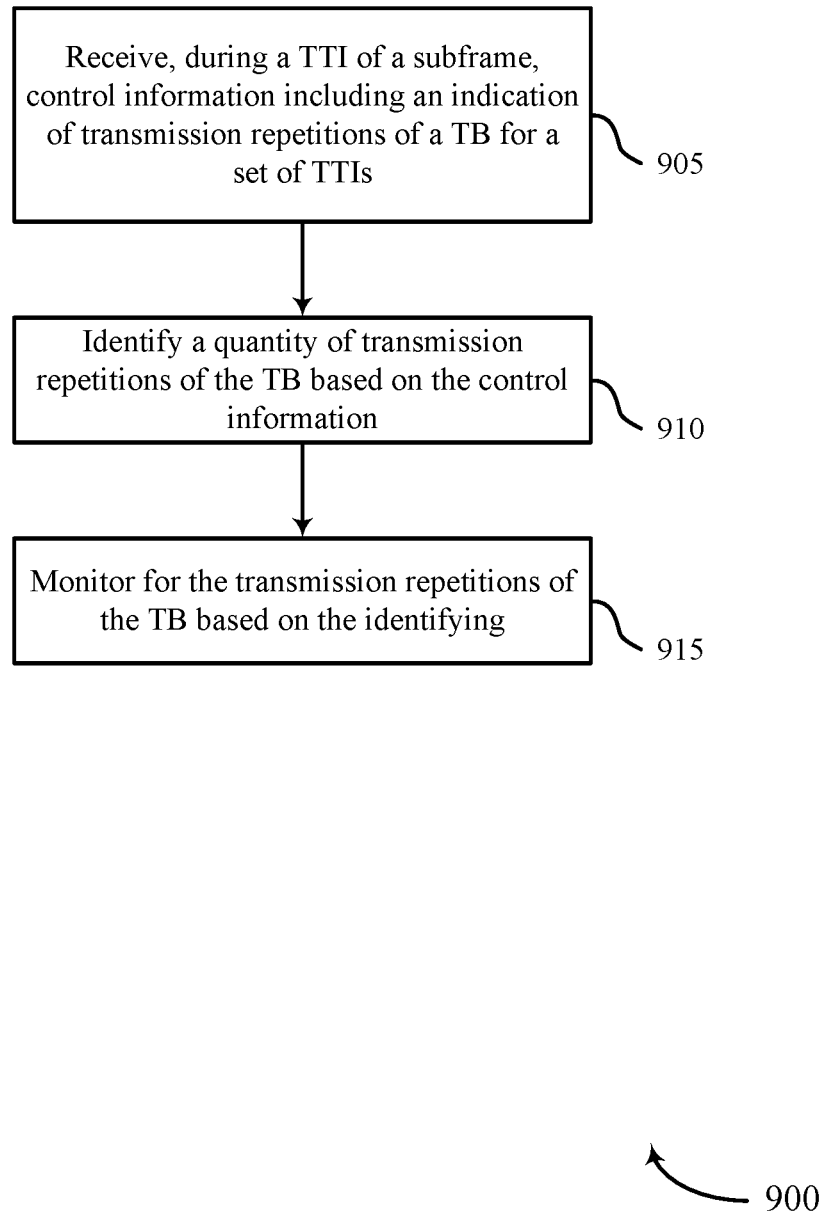
FIGS. 9 through 12 show flowcharts illustrating methods in accordance with aspects of the present disclosure.

FIG. 9 shows a flowchart illustrating a method 900 in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may receive, during a TTI of a subframe, control information including an indication of transmission repetitions of a TB for a set of TTIs. In some examples, the receiving of the control information may occur during the TTI of a slot (e.g., a first slot or a second slot) of the subframe. The operations of 905 may be performed according to the methods described herein. In some examples, aspects of the operations of 905 may be performed by a receiver as described with reference to FIGS. 5 through 8.

At 910, the device may identify a quantity of transmission repetitions of the TB based on the received control information. The operations of 910 may be performed according to the methods described herein. In some examples, aspects of the operations of 910 may be performed by an identification component as described with reference to FIGS. 5 through 8.

At 915, the device may monitor for the transmission repetitions of the TB based on the identifying. The operations of 915 may be performed according to the methods described herein. In some examples, aspects of the operations of 915 may be performed by a monitoring component as described with reference to FIGS. 5 through 8.

Figure 10:
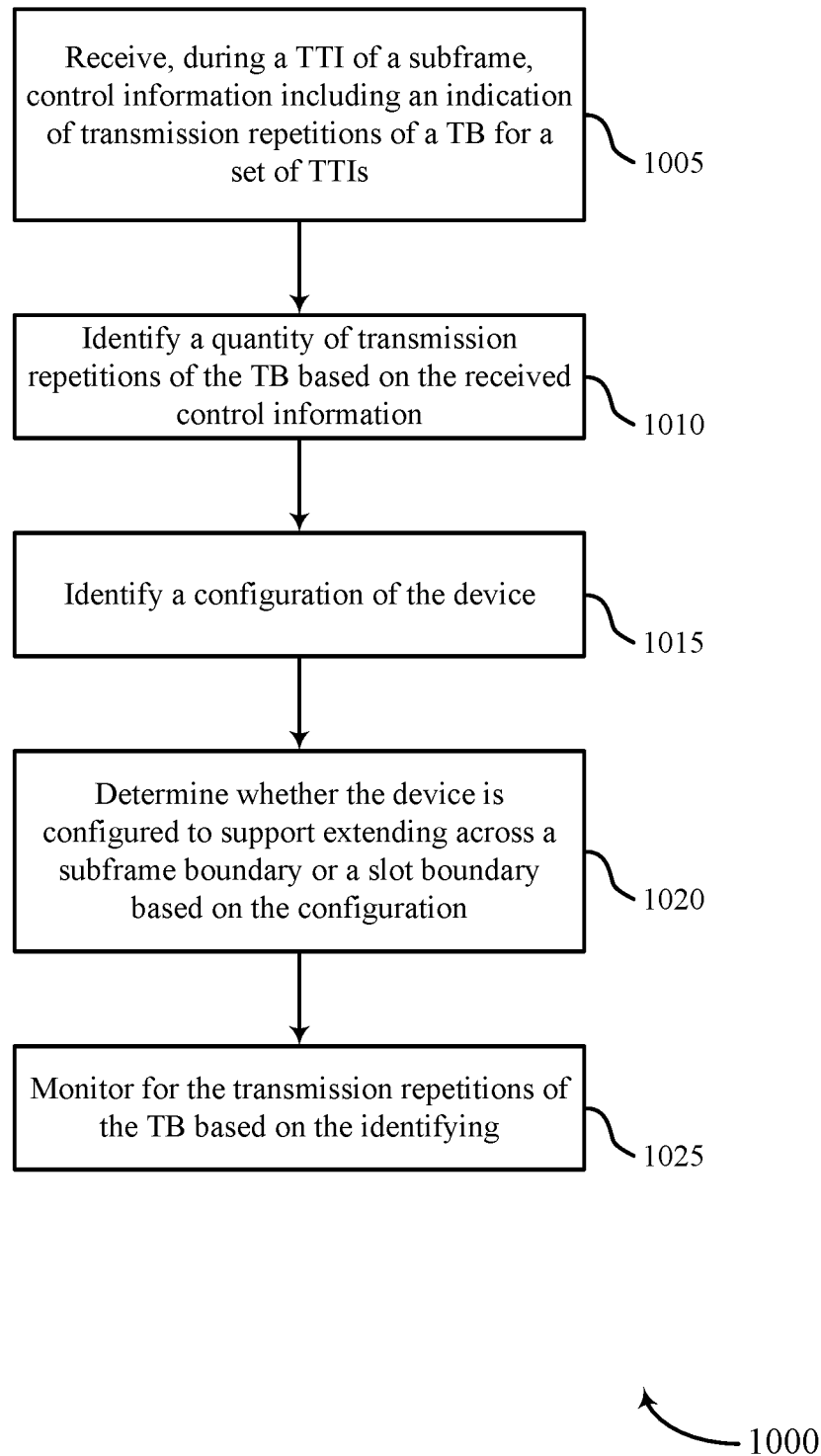

FIG. 10 shows a flowchart illustrating a method 1000 in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may receive, during a TTI of a subframe, control information including an indication of transmission repetitions of a TB for a set of TTIs. The operations of 1005 may be performed according to the methods described herein. In some examples, aspects of the operations of 1005 may be performed by a receiver as described with reference to FIGS. 5 through 8.

At 1010, the device may identify a quantity of transmission repetitions of the TB based on the control information. The operations of 1010 may be performed according to the methods described herein. In some examples, aspects of the operations of 1010 may be performed by an identification component as described with reference to FIGS. 5 through 8.

At 1015, the device may identify a configuration of the device. The operations of 1015 may be performed according to the methods described herein. In some examples, aspects of the operations of 1015 may be performed by an identification component as described with reference to FIGS. 5 through 8.

At 1020, the device may determine whether the device is configured to support extending across a subframe boundary or a slot boundary based on the configuration. The operations of 1020 may be performed according to the methods described herein. In some examples, aspects of the operations of 1020 may be performed by a determination component as described with reference to FIGS. 5 through 8.

At 1025, the device may monitor for the transmission repetitions of the TB based on the identifying. The operations of 1025 may be performed according to the methods described herein. In some examples, aspects of the operations of 1025 may be performed by a monitoring component as described with reference to FIGS. 5 through 8.

Figure 11:
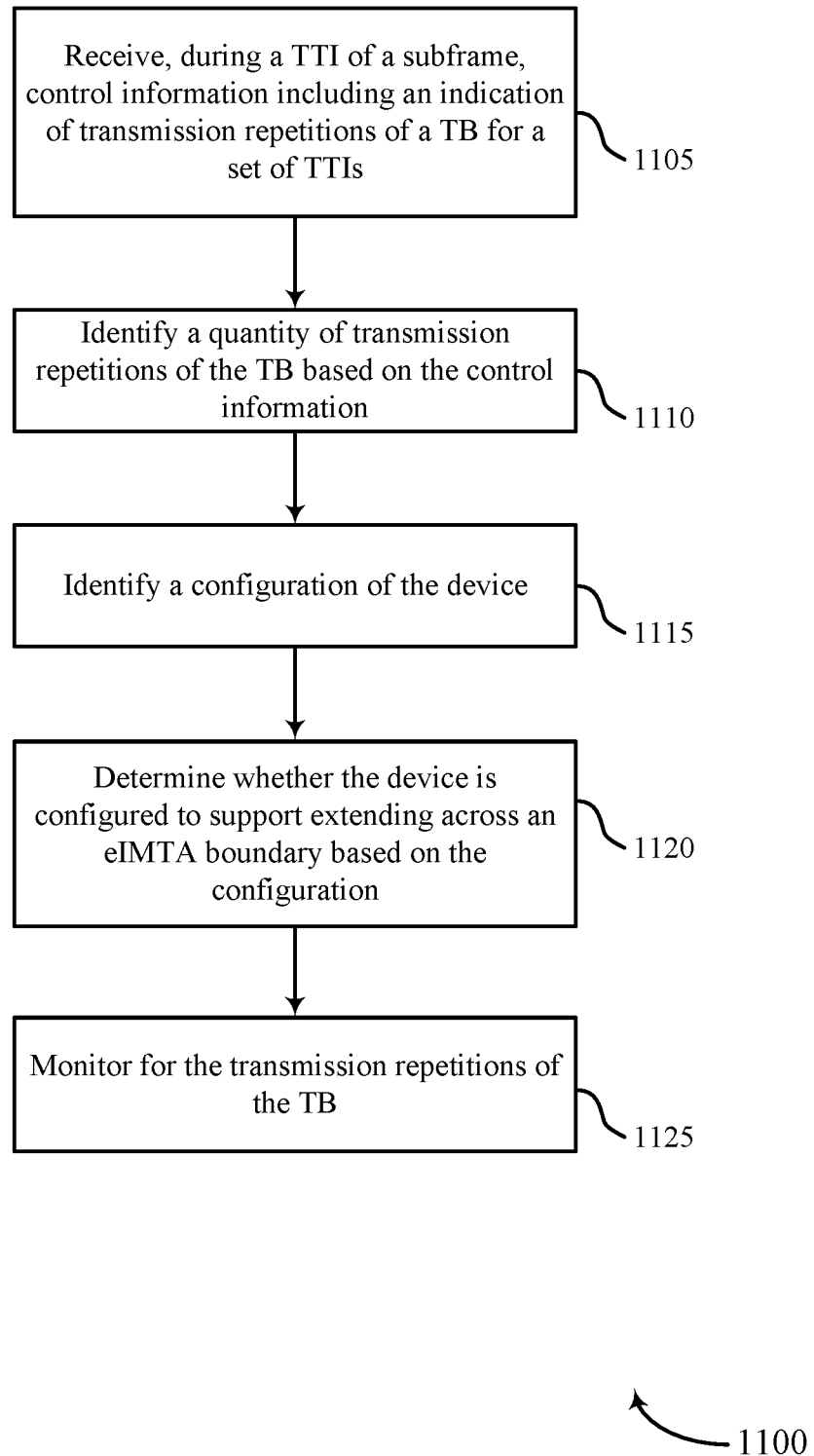

FIG. 11 shows a flowchart illustrating a method 1100 in accordance with aspects of the present disclosure. The operations of method 1100 may be implemented by a device or its components as described herein. For example, the operations of method 1100 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1105, the device may receive, during a TTI of a subframe, control information including an indication of transmission repetitions of a TB for a set of TTIs. The operations of 1105 may be performed according to the methods described herein. In some examples, aspects of the operations of 1105 may be performed by a receiver as described with reference to FIGS. 5 through 8.

At 1110, the device may identify a quantity of transmission repetitions of the TB based on the control information. The operations of 1110 may be performed according to the methods described herein. In some examples, aspects of the operations of 1110 may be performed by an identification component as described with reference to FIGS. 5 through 8.

At 1115, the device may identify a configuration of the device. The operations of 1115 may be performed according to the methods described herein. In some examples, aspects of the operations of 1115 may be performed by an identification component as described with reference to FIGS. 5 through 8.

At 1120, the device may determine whether the device is configured to support extending across an eIMTA boundary based on the configuration. The operations of 1120 may be performed according to the methods described herein. In some examples, aspects of the operations of 1120 may be performed by a determination component as described with reference to FIGS. 5 through 8.

At 1125, the device may monitor for the transmission repetitions of the TB. The operations of 1125 may be performed according to the methods described herein. In some examples, aspects of the operations of 1125 may be performed by a monitoring component as described with reference to FIGS. 5 through 8.

Figure 12:
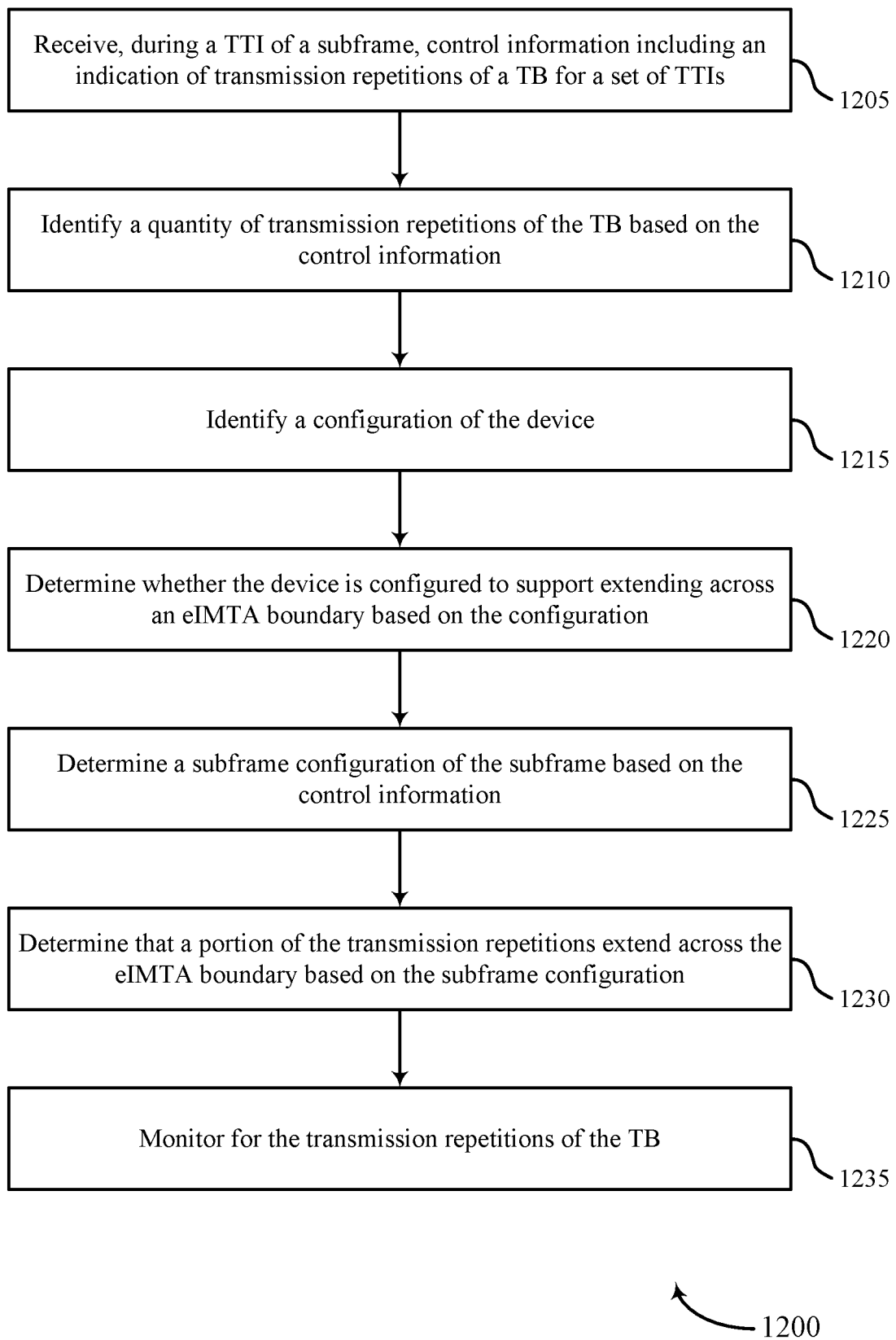

FIG. 12 shows a flowchart illustrating a method 1200 in accordance with aspects of the present disclosure. The operations of method 1200 may be implemented by a device or its components as described herein. For example, the operations of method 1200 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1205, the device may receive, during a TTI of a subframe, control information including an indication of transmission repetitions of a TB for a set of TTIs. The operations of 1205 may be performed according to the methods described herein. In some examples, aspects of the operations of 1205 may be performed by a receiver as described with reference to FIGS. 5 through 8.

At 1210, the device may identify a quantity of transmission repetitions of the TB based on the control information. The operations of 1210 may be performed according to the methods described herein. In some examples, aspects of the operations of 1210 may be performed by an identification component as described with reference to FIGS. 5 through 8.

At 1215, the device may identify a configuration of the device. The operations of 1215 may be performed according to the methods described herein. In some examples, aspects of the operations of 1215 may be performed by an identification component as described with reference to FIGS. 5 through 8.

At 1220, the device may determine whether the device is configured to support extending across an eIMTA boundary based on the configuration. The operations of 1220 may be performed according to the methods described herein. In some examples, aspects of the operations of 1220 may be performed by a determination component as described with reference to FIGS. 5 through 8.

At 1225, the device may determine a subframe configuration of the subframe based on the control information. The operations of 1225 may be performed according to the methods described herein. In some examples, aspects of the operations of 1225 may be performed by a determination component as described with reference to FIGS. 5 through 8.

At 1230, the device may determine that a portion of the transmission repetitions extend across the eIMTA boundary based on the subframe configuration. The operations of 1230 may be performed according to the methods described herein. In some examples, aspects of the operations of 1230 may be performed by a determination component as described with reference to FIGS. 5 through 8.

At 1235, the device may monitor for the transmission repetitions of the TB. The operations of 1235 may be performed according to the methods described herein. In some examples, aspects of the operations of 1235 may be performed by a monitoring component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network entity, comprising:
   transmitting control information comprising an indication of a quantity of transmission repetitions of a transport block (TB) for a plurality of transmission time intervals (TTIs) of a subframe, wherein at least one subslot of the subframe is not counted in the quantity of transmission repetitions;
   and
   transmitting the transmission repetitions of the TB in accordance with the control information.

2. The method of claim 1, wherein transmitting the control information further comprises:
   transmitting a control format indicator (CFI) comprising a field indicating an availability of a TTI of the plurality of TTIs for transmission repetitions.

3. The method of claim 2, wherein the CFI is transmitted dynamically or semi-statically.

4. The method of claim 3, wherein the CFI is transmitted on a physical control format indicator channel (PCFICH) or via higher layer signaling.

5. The method of claim 2, wherein the TTI is an initial TTI associated with a TTI index.

6. The method of claim 5, further comprising:
   puncturing the initial TTI associated with the TTI index based at least in part on a value in the field of the CFI.

7. The method of claim 5, wherein the TTI is a mini-slot.

8. The method of claim 1, further comprising:
   transmitting a subframe reconfiguration message based at least in part on the transmission repetitions extending across a special switching subframe (SSF) associated with the subframe.

9. The method of claim 1, wherein transmitting the transmission repetitions further comprises:
   transmitting a physical downlink shared channel (PDSCH) for the transmission repetitions of the TB.

10. The method of claim 1, wherein each transmission repetition is transmitted in a different TTI of a respective repetition window.

11. An apparatus for wireless communications, comprising:
    a processor;
    memory in electronic communication with the processor; and
    instructions stored in the memory and executable by the processor to cause the apparatus to:
      transmit control information comprising an indication of a quantity of transmission repetitions of a transport block (TB) for a plurality of transmission time intervals (TTIs) of a subframe, wherein at least one subslot of the subframe is not counted in the quantity of transmission repetitions;
      and
      transmit the transmission repetitions of the TB in accordance with the control information.

12. The apparatus of claim 11, wherein the instructions to transmit the control information are executable by the processor to cause the apparatus to:
    transmit a control format indicator (CFI) comprising a field indicating an availability of a TTI of the plurality of TTIs for transmission repetitions.

13. The apparatus of claim 12, wherein the CFI is transmitted dynamically or semi-statically.

14. The apparatus of claim 13, wherein the CFI is transmitted on a physical control format indicator channel (PCFICH) or via higher layer signaling.

15. The apparatus of claim 12, wherein the TTI is an initial TTI associated with a TTI index.

16. The apparatus of claim 15, wherein the instructions are further executable by the processor to cause the apparatus to:
    puncture the initial TTI associated with the TTI index based at least in part on a value in the field of the CFI.

17. The apparatus of claim 15, wherein the TTI is a mini-slot.

18. The apparatus of claim 11, wherein the instructions are further executable by the processor to cause the apparatus to:
    transmit a subframe reconfiguration message based at least in part on the transmission repetitions extending across a special switching subframe (SSF) associated with the subframe.

19. The apparatus of claim 11, wherein the instructions to transmit the transmission repetitions are executable by the processor to cause the apparatus to:
    transmit a physical downlink shared channel (PDSCH) for the transmission repetitions of the TB.

20. The apparatus of claim 11, wherein each transmission repetition is transmitted in a different TTI of a respective repetition window.

21. An apparatus for wireless communications, comprising:
    means for transmitting control information comprising an indication of a quantity of transmission repetitions of a transport block (TB) for a plurality of transmission time intervals (TTIs) of a subframe, wherein at least one subslot of the subframe is not counted in the quantity of transmission repetitions;
    means for transmitting the transmission repetitions of the TB in accordance with the control information.

22. The apparatus of claim 21, wherein the means for transmitting the control information further comprises:
    means for transmitting a control format indicator (CFI) comprising a field indicating an availability of a TTI of the plurality of TTIs for transmission repetitions.

23. The apparatus of claim 22, wherein the CFI is transmitted dynamically or semi-statically.

24. The apparatus of claim 23, wherein the CFI is transmitted on a physical control format indicator channel (PCFICH) or via higher layer signaling.

25. The apparatus of claim 22, wherein the TTI is an initial TTI associated with a TTI index.

26. The apparatus of claim 25, further comprising:
    means for puncturing the initial TTI associated with the TTI index based at least in part on a value in the field of the CFI.

27. The apparatus of claim 21, further comprising:
    means for transmitting a subframe reconfiguration message based at least in part on the transmission repetitions extending across a special switching subframe (SSF) associated with the subframe.

28. The apparatus of claim 21, wherein the means for transmitting the transmission repetitions further comprises:
    means for transmitting a physical downlink shared channel (PDSCH) for the transmission repetitions of the TB.

29. The apparatus of claim 21, wherein each transmission repetition is transmitted in a different TTI of a respective repetition window.

30. A non-transitory computer-readable medium storing code for wireless communications, the code comprising instructions executable by a processor to:
    transmit control information comprising an indication of a quantity of transmission repetitions of a transport block (TB) for a plurality of transmission time intervals (TTIs) of a subframe, wherein at least one subslot of the subframe is not counted in the quantity of transmission repetitions;
and
transmit the transmission repetitions of the TB in accordance with the control information.

\* \* \* \* \*